US012750820B2

(12) United States Patent
Leon Calvo et al.

(10) Patent No.: US 12,750,820 B2
(45) Date of Patent: Sep. 29, 2026

(54) ADAPTIVE SENSING BASED RESOURCE SELECTION FOR D2D COMMUNICATION

(71) Applicant: Telefonaktiebolaget LM Ericsson (publ), Stockholm (SE)

(72) Inventors: Jose Angel Leon Calvo, Aachen (DE); Ricardo Blasco Serrano, Espoo (FI); Shehzad Ali Ashraf, Aachen (DE); Zhang Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 687 days.

(21) Appl. No.: 18/019,261

(22) PCT Filed: Aug. 4, 2020

(86) PCT No.: PCT/CN2020/106869
§ 371 (c)(1),
(2) Date: Feb. 2, 2023

(87) PCT Pub. No.: WO2022/027246
PCT Pub. Date: Feb. 10, 2022

(65) Prior Publication Data

US 2023/0309065 A1 Sep. 28, 2023

(51) Int. Cl.
*H04W 72/02* (2009.01)
*H04W 72/52* (2023.01)
*H04W 72/563* (2023.01)

(52) U.S. Cl.
CPC ........... *H04W 72/02* (2013.01); *H04W 72/52* (2023.01); *H04W 72/563* (2023.01)

(58) Field of Classification Search
CPC .... H04W 72/02; H04W 72/563; H04W 72/52
See application file for complete search history.

(56) References Cited

U.S. PATENT DOCUMENTS 9,882,700 B2 1/2018 Yin et al.
10,292,158 B2 5/2019 Yerramalli et al.
(Continued)

FOREIGN PATENT DOCUMENTS

CN 110139239 A 8/2019
CN 110545534 A 12/2019
(Continued)

OTHER PUBLICATIONS

3GPP, "3GPP TR 37.985 V16.0.0", 3rd Generation Partnership Project; Technical Specification Group Radio Access Network; Overall description of Radio Access Network (RAN) aspects for Vehicle-to-everything (V2X) based on LTE and NR (Release 16), Jun. 2020, 1-35.
(Continued)

*Primary Examiner* — Yemane Mesfin
(74) *Attorney, Agent, or Firm* — Murphy, Bilak & Homiller, PLLC

(57) ABSTRACT

A wireless communication device (10) configures a selection window and a sensing window. The selection window indicates radio resources allowed to be selected by the wireless communication device for a D2D transmission by the wireless communication device (10) and the sensing window indicates which radio resources are to be used for estimating an occupation status of the radio resources in the selection window. By monitoring the radio resources indicated by the sensing window, the wireless communication device (10) estimates the occupation status of the radio resources in the selection window. Based on the estimated occupation status of the radio resources in the selection window, the wireless communication device (10) selects radio resources from the selection window. Using the selected radio resources, the wireless communication device (10) performs at least one D2D transmission to at least one
(Continued)

further wireless communication device (10). Further, the wireless communication device obtains feedback information related to the at least one performed D2D transmission. Based on the obtained feedback information, the wireless communication device (10) adapts at least one of the sensing window and the selection window.

20 Claims, 11 Drawing Sheets

(56) References Cited

U.S. PATENT DOCUMENTS

| | | | |
|---|---|---|---|
| 2018/0359659 A1 | 12/2018 | Cai et al. | |
| 2019/0190679 A1 | 6/2019 | Yerramalli et al. | |
| 2020/0029340 A1 | 1/2020 | He et al. | |
| 2020/0100284 A1 | 3/2020 | Li et al. | |
| 2023/0084593 A1* | 3/2023 | Hoang | H04W 52/0225 370/311 |

FOREIGN PATENT DOCUMENTS

| | | |
|---|---|---|
| CN | 111148223 A | 5/2020 |
| CN | 111294942 A | 6/2020 |
| CN | 111447682 A | 7/2020 |
| EP | 3522630 A1 | 8/2019 |
| EP | 4192144 A1 | 6/2023 |
| KR | 20200068744 A | 6/2020 |
| WO | 2020029067 A1 | 2/2020 |
| WO | 2022024330 A1 | 2/2022 |

OTHER PUBLICATIONS

3GPP, "3GPP TS 36.331 V16.1.1", 3rd Generation Partnership Project; Technical Specification Group Radio Access Network; Evolved Universal Terrestrial Radio Access (E-UTRA); Radio Resource Control (RRC); Protocol specification (Release 16), Jul. 2020, 1-1078.

3GPP, "3GPP TS 38.214 V16.2.0", 3rd Generation Partnership Project; Technical Specification Group Radio Access Network; NR; Physical layer procedures for data (Release 16), Jun. 2020, 1-163.

3GPP, "3rd Generation Partnership Project; Technical Specification Group Radio Access Network; NR; Study on NR Vehicle-to-Everything (V2X) (Release 16)", 3GPP TR 38.885 V16.0.0, Mar. 2019, 1-122.

LG Electronics, "New WID on NR sidelink enhancement", 3GPP TSG RAN Meeting #86, RP-193231, (revision of RP-193134), Sitges, Spain, Dec. 9-12, 2019, 1-6.

Molina-Masegosa, Rafael, et al., "Configuration of the C-V2X Mode 4 Sidelink PC5 Interface for Vehicular Communication", 2018 14th International Conference on Mobile Ad-Hoc and Sensor Networks (MSN), Dec. 2018, 1-7.

* cited by examiner

ADAPTIVE SENSING BASED RESOURCE SELECTION FOR D2D COMMUNICATION

TECHNICAL FIELD

The present invention relates to methods for controlling device-to-device (D2D) communication and to corresponding devices, systems, and computer programs.

BACKGROUND

Current wireless communication networks, e.g., based on the LTE (Long Term Evolution) or NR technology as specified by 3GPP (3rd Generation Partnership Project), also support D2D communication modes to enable direct communication between UEs (user equipments), sometimes also referred to as sidelink (SL) communication. Such D2D communication modes may for example be used for vehicle communications, e.g., including communication between vehicles, between vehicles and roadside communication infrastructure and, possibly, between vehicles and cellular networks. Due to wide range of different types of devices that might be involved in the communication with the vehicles, vehicle-to-everything (V2X) communication is another term used to refer to this class of communication. Vehicle communications have the potential to increase traffic safety, reduce energy consumption and enable new services related to intelligent transportation systems.

Due to the nature of the basic road safety services, LTE V2X functionalities have been designed for broadcast transmissions, i.e., for transmissions where all receivers within a certain range of a transmitter may receive a message from the transmitter, i.e., may be regarded as intended recipients. In fact, the transmitter may not be aware or otherwise be able to control the group of intended receivers. V2X functionalities for the NR technology are for example described in 3GPP TR 38.885 V16.0.0 (2019-03).

SL communication in the NR technology supports the following transmission modes, which are sometimes referred to as casting modes:

Broadcast, which is not addressed to any specific UE but to any UE that may be interested. This type of transmission does not involve feedback from receiver to transmitted.

Unicast, which is addressed to one specific UE. The receiver of the transmission may provide HARQ (Hybrid Automatic Repeat Request) feedback in the form of a positive acknowledgement (ACK) or a negative acknowledgement (NACK), also denoted as HARQ-ACK and HARQ-NACK, respectively.

Groupcast, which is addressed to a specific group of UEs. For groupcast, two variants can be distinguished. In a first variant a receiver may provide feedback in the form of a HARQ-NACK only. Accordingly, a receiver informs the receiver only about incorrectly decoded transmissions of data. In a second variant, a receiver may provide feedback in the form of a HARQ-ACK or HARQ-NACK.

Accordingly, in the NR technology, also more targeted V2X services can be considered, by also utilizing groupcast, multicast, or unicast transmissions, in which the intended receiver of a message consists of only a subset of the receivers within a certain range of the transmitter (groupcast) or of a single receiver (unicast). For example, in a platooning service for vehicles there may be certain messages that are only of interest for a member vehicle of the platoon, so that the member vehicles of the platoon can be efficiently targeted by a groupcast transmission. In another example, the see-through functionality, where one vehicle provides video data from a front facing camera to a following vehicle, may involve V2X communication of only a pair of vehicles, for which unicast transmissions may be a preferred choice.

Furthermore, NR SL communication supports D2D communication of UEs with and without network coverage, with varying degrees of interaction between the UEs and the network, including the possibility of standalone, networkless operation.

Further potential use cases of D2D communication include NSPS (National Security and Public Safety), Network Controlled Interactive Service (NCIS), and for railways. In order to provide a wider coverage of NR SL for such use cases, it further enhancements of the NR SL technology are being considered. One of such enhancements is power saving which enables UEs with battery constraint to perform SL operations in a power efficient manner. For example, 3GPP work item description "NR Sidelink Enhancement", document RP-193231, TSG RAN Meeting #86 (2019-12), suggests investigation of ways to improvement of performance for power limited UEs, e.g., like pedestrian UEs, UEs associated with first responders, or the like.

For SL communication in the LTE technology and in the NR technology, there are in principle two resource allocation modes: A first resource allocation mode uses network-based resource allocation. In this case the network selects the resources and other transmit parameters to be used for an SL transmission. In some cases, the network may control every single SL transmission parameter. In other cases, the network may select the resources to be used for transmission but may give the transmitting UE some freedom to select transmission parameters, possibly with some restrictions. In the NR technology, this resource allocation mode is denoted as "Mode 1". A second resource allocation mode uses autonomous resource allocation. In this case the UEs autonomously select the resources and other transmit parameters to be used for an SL transmission. In this mode, the resource allocation may be accomplished without assistance by the network, which is for example useful for out-of-coverage UEs, when using unlicensed carriers, or for operation without a network deployment. In some cases, there may be minimal assistance by the network, e.g., by configuration of pools of resources, or the like. In the NR technology, this autonomous resource allocation mode is denoted as "Mode 2".

The Mode 2 resource allocation of the NR technology uses a distributed resource selection mechanism, i.e., there is no central node for scheduling and UEs engaged in SL communication have equal responsibilities in the autonomous resource selection process. Here, the Mode 2 resource allocation is based on two functionalities: reservation of future resources and sensing-based resource allocation. Reservation of future resources is accomplished by the UE sending an SL transmission also notifying receivers of the SL transmission about its intention to transmit using certain time-frequency resources at a later point in time. For example, a UE transmitting at time T may inform the receivers that it will transmit using the same frequency resources at time T+100 ms. This resource reservation allows UEs to utilize the reservations to predict the utilization of the radio resources in the future. Accordingly, by listening to the current transmissions of another UE, a UE also obtains information about potential future transmissions intended by the other UE. This information can be used by the UE to avoid collisions when selecting its own resources. More specifically, a UE may predicts the future utilization of the radio resources by reading received booking messages and may then schedule its current transmission to avoid selecting the same resources. This is also known as sensing-based resource selection. Details on the sensing-based resource selection can for example be found in 3GPP TS 38.214 V16.2.0 (2020-07).

The sensing-based resource selection can be summarized to include the following steps:

a) A UE senses the transmission medium during an interval [n−a, n−b], where n is a time reference, and a>b≥0 define the duration of the sensing window. The length of the sensing window is (pre-)configurable.
b) Based on the sensing results, the UE predicts the future utilization of the transmission medium at a future time interval [n+T1, n+T2], where T2>T1≥0. The interval [n+T1, n+T2] is the resource selection window.
c) The UE selects one or more time-frequency resources among the resources in the selection window [n+T1, n+T2] that are predicted to be selectable (e.g., idle, usable, available, etc.).

For SL communication in the LTE technology, two procedures for resource selection in a transmission mode denoted as "Mode 4" were introduced, which aim at enabling reduced power consumption: partial sensing and random selection for pedestrian UEs. In case of partial sensing, the pedestrian UE uses a reduced selection/sensing window which is a subset of the selection/sensing window used when performing normal sensing. In this way, partial sensing allows for reducing power consumption at the expense of a moderate increase in resource collision probability. in the case of random selection, the UE skips sensing altogether. The latter variant may provide significant benefits in terms of power saving. However, these benefits may come at the risk of rather high of collision probability.

For each resource pool to be used for SL transmission, a resource selection mechanism, e.g., random selection, partial sensing-based selection, or either random selection or partial sensing-based selection may be configured as being allowed to be used for selection from this resource pool. If UE is configured to use either random selection or partial sensing-based selection for one resource pool, it is up to UE implementation to select a specific resource selection mechanism. If the UE is configured to use partial sensing-based selection only, the UE shall use partial sensing-based selection for the resource pool. Accordingly, the UE shall not use random selection when only partial sensing is allowed for the resource pool. If the eNB does not provide a resource pool allowing random selection, the UEs that support only random selection cannot perform SL transmission. In an exceptional resource pool, the UE may use random selection. By RRC (Radio Resource Control) signalling, the UE can send a "Sidelink UE Information message" to indicate that it requests resource pools for P2X-related V2X sidelink communication transmission. The latter possibility is for example specified in 3GPP TS 36.331 V16.1.1 (2020-07).

The above-mentioned sensing-based resource allocation mechanisms used in the LTE technology and the NR technology typically result in rather high power consumption by the UE, because the UE needs to continuously sense the transmission medium. On the other hand, the reduced power consumption offered by the partial sensing mechanism of the LTE technology may result in increased collision probability, which may in turn adversely affect overall system performance. Furthermore, the partial sensing mechanism of the LTE technology is not applicable to the NR technology, because this partial sensing mechanism is based on assuming that the SL traffic in the system is periodic. This is however not the case in the NR technology, which also targets use cases with aperiodic SL transmissions.

Accordingly, there is a need for techniques which allow for efficiently implementing resource allocation for SL transmissions and other types of D2D transmission.

SUMMARY

According to an embodiment, a method of controlling D2D communication is provided. According to the method, a wireless communication device configures a selection window and a sensing window. The selection window indicates radio resources allowed to be selected by the wireless communication device for a D2D transmission by the wireless communication device and the sensing window indicates which radio resources are to be used for estimating an occupation status of the radio resources in the selection window. By monitoring the radio resources indicated by the sensing window, the wireless communication device estimates the occupation status of the radio resources in the selection window. Based on the estimated occupation status of the radio resources in the selection window, the wireless communication device selects radio resources from the selection window. Using the selected radio resources, the wireless communication device performs at least one D2D transmission to at least one further wireless communication device. Further, the wireless communication device obtains feedback information related to the at least one performed D2D transmission. Based on the obtained feedback information, the wireless communication device adapts at least one of the sensing window and the selection window.

According to a further embodiment, a method of controlling D2D communication is provided. According to the method, a node of a wireless communication network configures a selection window and a sensing window of a wireless communication device. The selection window indicates radio resources allowed to be selected by the wireless communication device for a D2D transmission by the wireless communication device and the sensing window indicates which radio resources are to be used for estimating an occupation status of the radio resources in the selection window. Further, the node of the wireless communication network configures the wireless communication device for adapting at least one of the sensing window and the selection window based on feedback information related to at least one D2D transmission performed by the wireless communication device on radio resources selected by the wireless communication device based on the estimated occupation status of the radio resources in the selection window.

According to a further embodiment, a wireless communication device is provided. The wireless communication device is configured to configure a selection window and a sensing window. The selection window indicates radio resources allowed to be selected by the wireless communication device for a D2D transmission by the wireless communication device and the sensing window indicates which radio resources are to be used for estimating an occupation status of the radio resources in the selection window. Further, the wireless communication device is configured to, by monitoring the radio resources indicated by the sensing window, estimate the occupation status of the radio resources in the selection window. Further, the wireless communication device is configured to, based on the estimated occupation status of the radio resources in the selection window, select radio resources from the selection window. Further, the wireless communication device is configured to, using the selected radio resources, perform at least one D2D transmission to at least one further wireless communication device. Further, the wireless communication device is configured to obtain feedback information related to the at least one performed D2D transmission. Further, the wireless communication device is configured to, based on the obtained feedback information, adapt at least one of the sensing window and the selection window.

According to a further embodiment, a wireless communication device is provided. The wireless communication device comprises at least one processor and a memory. The memory contains instructions executable by said at least one processor, whereby the wireless communication device is operative to configure a selection window and a sensing window. The selection window indicates radio resources allowed to be selected by the wireless communication device for a D2D transmission by the wireless communication device and the sensing window indicates which radio resources are to be used for estimating an occupation status of the radio resources in the selection window. Further, the memory contains instructions executable by said at least one processor, whereby the wireless communication device is operative to, by monitoring the radio resources indicated by the sensing window, estimate the occupation status of the radio resources in the selection window. Further, the memory contains instructions executable by said at least one processor, whereby the wireless communication device is operative to, based on the estimated occupation status of the radio resources in the selection window, select radio resources from the selection window. Further, the memory contains instructions executable by said at least one processor, whereby the wireless communication device is operative to using the selected radio resources, perform at least one D2D transmission to at least one further wireless communication device. Further, the memory contains instructions executable by said at least one processor, whereby the wireless communication device is operative to obtain feedback information related to the at least one performed D2D transmission. Further, the memory contains instructions executable by said at least one processor, whereby the wireless communication device is operative to, based on the obtained feedback information, adapt at least one of the sensing window and the selection window.

According to a further embodiment, a node for a wireless communication network is provided. The node is configured to configure a selection window and a sensing window of a wireless communication device. The selection window indicates radio resources allowed to be selected by the wireless communication device for a D2D transmission by the wireless communication device and the sensing window indicates which radio resources are to be used for estimating an occupation status of the radio resources in the selection window. Further, node is configured to configure the wireless communication device for adapting at least one of the sensing window and the selection window based on feedback information related to at least one D2D transmission performed by the wireless communication device on radio resources selected by the wireless communication device based on the estimated occupation status of the radio resources in the selection window.

According to a further embodiment, a node for a wireless communication network is provided. The node comprises at least one processor and a memory. The memory contains instructions executable by said at least one processor, whereby the node is operative to configure a selection window and a sensing window of a wireless communication device. The selection window indicates radio resources allowed to be selected by the wireless communication device for a D2D transmission by the wireless communication device and the sensing window indicates which radio resources are to be used for estimating an occupation status of the radio resources in the selection window. Further, memory contains instructions executable by said at least one processor, whereby the node is operative to configure the wireless communication device for adapting at least one of the sensing window and the selection window based on feedback information related to at least one D2D transmission performed by the wireless communication device on radio resources selected by the wireless communication device based on the estimated occupation status of the radio resources in the selection window.

According to a further embodiment of the invention, a computer program or computer program product is provided, e.g., in the form of a non-transitory storage medium, which comprises program code to be executed by at least one processor of a wireless communication device. Execution of the program code causes the wireless communication device to configure a selection window and a sensing window. The selection window indicates radio resources allowed to be selected by the wireless communication device for a D2D transmission by the wireless communication device and the sensing window indicates which radio resources are to be used for estimating an occupation status of the radio resources in the selection window. Further, execution of the program code causes the wireless communication device to, by monitoring the radio resources indicated by the sensing window, estimate the occupation status of the radio resources in the selection window. Further, execution of the program code causes the wireless communication device to, based on the estimated occupation status of the radio resources in the selection window, select radio resources from the selection window. Further, execution of the program code causes the wireless communication device to, using the selected radio resources, perform at least one D2D transmission to at least one further wireless communication device. Further, execution of the program code causes the wireless communication device to obtain feedback information related to the at least one performed D2D transmission. Further, execution of the program code causes the wireless communication device to, based on the obtained feedback information, adapt at least one of the sensing window and the selection window.

According to a further embodiment of the invention, a computer program or computer program product is provided, e.g., in the form of a non-transitory storage medium, which comprises program code to be executed by at least one processor of a node for a wireless communication network. Execution of the program code causes the node to configure a selection window and a sensing window of a wireless communication device. The selection window indicates radio resources allowed to be selected by the wireless communication device for a D2D transmission by the wireless communication device and the sensing window indicates which radio resources are to be used for estimating an occupation status of the radio resources in the selection window. Further, execution of the program code causes the node to configure the wireless communication device for adapting at least one of the sensing window and the selection window based on feedback information related to at least one D2D transmission performed by the wireless communication device on radio resources selected by the wireless communication device based on the estimated occupation status of the radio resources in the selection window.

Details of such embodiments and further embodiments will be apparent from the following detailed description of embodiments.

DETAILED DESCRIPTION OF EMBODIMENTS

Figure 1:
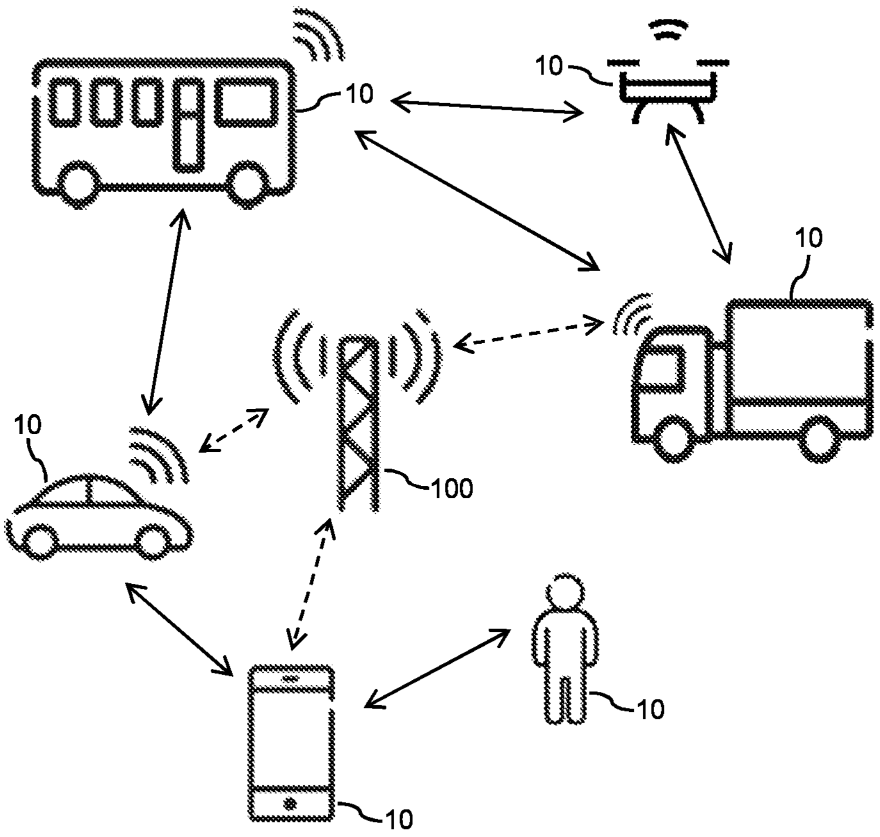
FIG. 1 schematically illustrates an exemplary V2X scenario in which D2D communication may be controlled according to an embodiment of the invention.

In the following, concepts in accordance with exemplary embodiments of the invention will be explained in more detail and with reference to the accompanying drawings. The illustrated embodiments relate to controlling of D2D communication by wireless communication devices. These wireless communication devices may include various types of UEs or other wireless devices (WDs). As used herein, the term "wireless device" (WD) refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, a connected vehicle, etc. In some examples, in an Internet of Things (IoT) scenario, a WD may also represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal. The illustrated concepts particularly concern WDs that support D2D communication, for example by implementing a 3GPP standard for sidelink communication, Vehicle-to-Vehicle (V2V), Vehicle-to-Infrastructure (V2I), Vehicle-to-Everything (V2X). The D2D communication may for example be based on the LTE radio technology or the NR radio technology as specified by 3GPP, e.g., on the PC5 interface of the LTE or NR technology. However, it is noted that the illustrated concepts could also be applied to other radio technologies, e.g., a WLAN (Wireless Local Area Network) technology. In the D2D communication considered herein, a WD may act as a receiver, herein also denoted as RX UE, and/or as a transmitter, herein also denoted as TX UE.

In the illustrated concepts, resource selection for D2D communication may be performed in an efficient manner by using a resource allocation mechanism which is based on an adaptive selection window and/or an adaptive sensing window for selecting resources to be used in the D2D communication. The resources may be resources organized in a time frequency grid. Accordingly, the selection window and the sensing window may each have a length defined along a time coordinate of the time-frequency grid and a width defined along a frequency coordinate of the time frequency grid. The selection window and/or the sensing window may be adapted with respect to its length, i.e., by shortening or extending a time duration of the selection window and/or of the sensing window. Further, it is also possible to adapt the selection window and/or the sensing window with respect to its width, i.e., by adding or removing frequency resources. Further, it is also possible to adapt the selection window and/or the sensing window with respect to its position in the time-frequency grid.

In some scenarios, the adaptation of the selection window and/or of the sensing window may be based on feedback information obtained for one or more D2D transmissions. The feedback information may indicate whether the D2D transmission was successfully received. For example, the feedback information may be based on HARQ feedback. In this case, the adaptation may for example involve that, in response to negative feedback for one or more D2D transmissions, i.e., feedback indicating that the D2D transmissions were not successfully received, the selection window and/or of the sensing window is enlarged, typically by increasing its length. Similarly, the adaptation may for example involve that, in response to positive feedback for one or more D2D transmissions, i.e., feedback indicating that the D2D transmission(s) were successfully received, the selection window and/or of the sensing window is reduced, typically by reducing its length. Further, also other input than the feedback information may be used as a basis for the adaptation of the selection window and/or of the sensing window, e.g., congestion information and/or priorities of D2D transmissions.

FIG. 1 illustrates an exemplary scenario involving V2X communications. In particular, FIG. 1 shows various UEs 10, which may engage in V2X communication or other D2D communication, illustrated by solid arrows. Further, FIG. 1 shows an access node 100 of a wireless communication network, e.g., an eNB of the LTE technology or a gNB of the NR technology, or an access point of a WLAN. At least some of the UEs 10 may also be capable of communicating by using DL radio transmissions and/or UL radio transmissions, illustrated by broken arrows.

The UEs 10 illustrated in FIG. 1 comprise vehicles, a drone, a mobile phone, and a person, e.g., a pedestrian, a cyclist, a driver of a vehicle, or a passenger of a vehicle. Here, it is noted that in the case of the vehicles the radio transmissions may be performed by a communication module installed in the vehicle, and that in the case of the person the radio transmissions may be performed by a radio device carried or worn by the person, e.g., a wristband device or similar wearable device. Furthermore, it is noted that the UEs shown in FIG. 1 are merely exemplary and that in the illustrated concepts other types of V2X communication device or D2D communication device could be utilized as well, e.g., RSUs (roadside units) or other infrastructure based V2X communication devices, V2X communication devices based in an aircraft, like an airplane, or helicopter, in a spacecraft, in a train or car of a train, in a ship, in a motorcycles, in a bicycle, in a mobility scooter, or in any other kind of mobility or transportation device. The V2X communication may also involve utilizing the illustrated mechanisms and for sensing based allocation of resources used in the V2X communication, thereby improving energy efficiency of the V2X communication.

Figure 2:
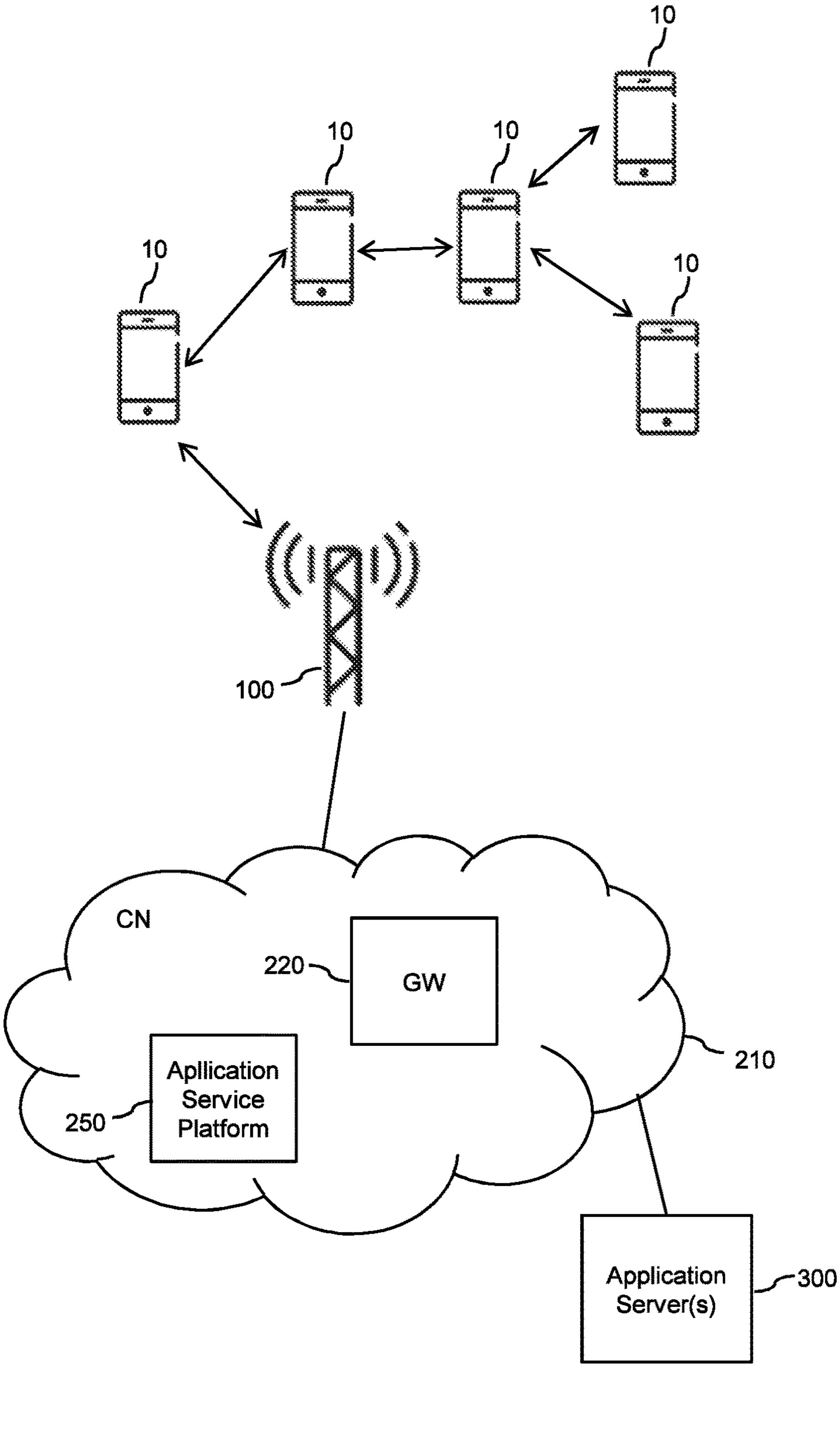
FIG. 2 schematically illustrates an exemplary scenario according to an embodiment of the invention, in which D2D communication may be controlled according to an embodiment.

FIG. 2 illustrates an exemplary D2D communication scenario. In particular, FIG. 2 shows multiple UEs 10, which are connected to each other by radio links implementing direct wireless links (illustrated by double-headed arrows). Further, one of the UEs 10 is connected by a radio link to an access node 100 of a wireless communication network, e.g., to an eNB of the LTE technology, or a gNB of the NR technology. The access node 100 is part of a RAN (Radio Access Network) of the wireless communication network, which typically also includes further access nodes to provide a desired coverage of the wireless communication network. Further, FIG. 2 shows a core network (CN) 210 of the wireless communication network. The CN 210 may provide connectivity of the UEs 10 to other data networks, e.g., through a GW 220 provided in the CN 210. Further, the CN 210 may also include various nodes for controlling operation of the UEs 10.

The radio links may be used for D2D communication between the UEs 10. Further, the radio link to the wireless communication network may be used for controlling or otherwise assisting the D2D communication. Further, the D2D communication and/or data communication with the wireless communication network may be used for providing various kinds of services to the UEs 10, e.g., a voice service, a multimedia service, a data service, an intelligent transportation system (ITS) or similar vehicular management or coordination service, an NSPS service, and/or an NCIS service. Such services may be based on applications which are executed on the UE 10 and/or on a device linked to the UE 10. Accordingly, in the illustrated concepts a D2D transmission may convey or correspond to a V2X message, an ITS message, or some other kind of message related to a service. Further, FIG. 2 illustrates an application service platform 250 in the CN 210 of the wireless communication network. Further, FIG. 2 illustrates one or more application servers 300 provided outside the wireless communication network. The application(s) executed on the UE 10 and/or on one or more other devices linked to the UE 10 may use the radio links with one or more other UEs 10, the application service platform 250, and/or the application server(s) 300, thereby enabling the corresponding service(s) on the UE 10. In some scenarios, the services utilized by the UEs may thus be hosted on the network side, e.g., on the application service platform 250 or on the application server(s) 300. However, some of the services may also network-independent so that they can be utilized without requiring an active data connection to the wireless communication network. This may for example apply to certain V2X or NSPS services. Such services may however still be assisted from the network side while the UE 10 is in coverage of the wireless communication network. Also in the scenario of FIG. 2, the UEs may apply the illustrated sensing based allocation of resources used in the D2D communication to improve energy efficiency.

In the example of FIG. 2, the UEs 10 are assumed to be a mobile phone and vehicles or vehicle-based communication devices, e.g., a vehicle-mounted or vehicle-integrated communication module, or a smartphone or other user device linked to vehicle systems. However, it is noted that other types of UE could be used as well, e.g., a device carried by a pedestrian, or an infrastructure-based device, such as a roadside unit, like for example illustrated in FIG. 1.

Figure 3:
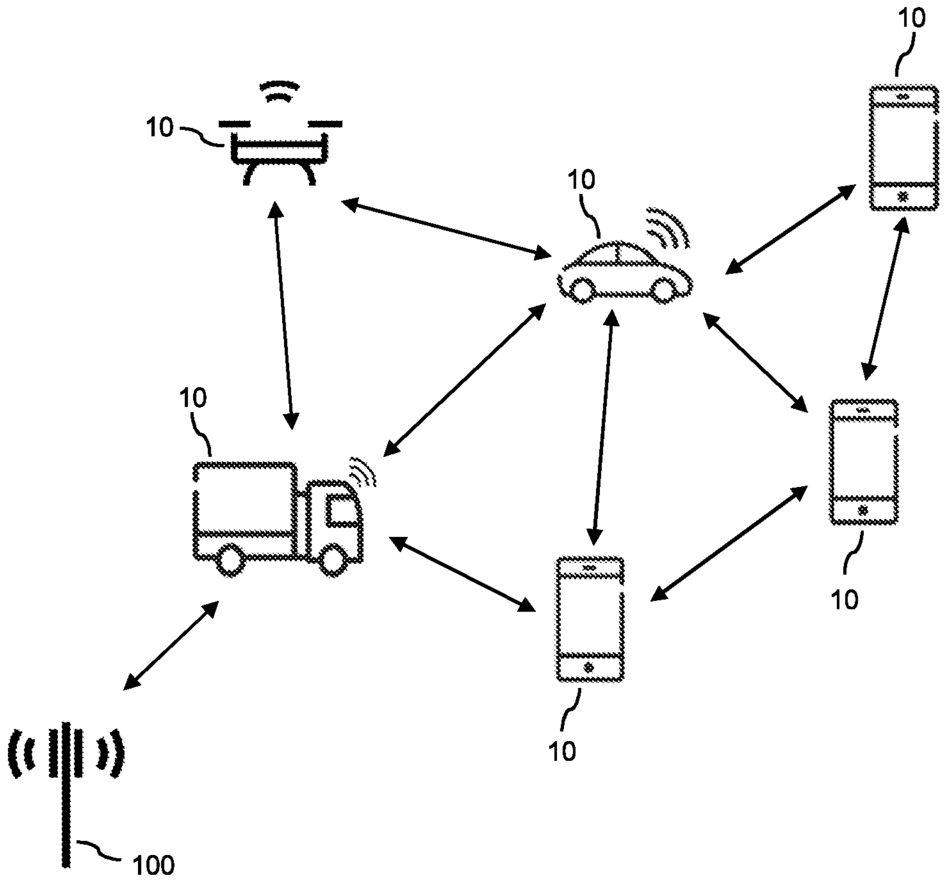
FIG. 3 schematically illustrates an exemplary NSPS communication scenario in which D2D communication may control establishment of a direct wireless link according to an embodiment.

FIG. 3 schematically illustrates an NSPS communication scenario. In particular, FIG. 3 shows multiple UEs 10, which may exchange NSPS messages associated with one or more NSPS services using D2D communication, e.g., based on the LTE sidelink communication or NR sidelink communication. As further illustrated, the NSPS services may be assisted from the network, by exchanging NSPS messages via access node 100. The NSPS services may for example include group communication of rescue vehicles, rescue personnel or other equipment or personnel of public safety related organizations. Such communication may also involve utilizing the illustrated sensing based allocation of resources used the D2D communication between the UEs 10, thereby improving energy efficiency of the D2D communication.

As mentioned above, in some scenarios the D2D communication to which the illustrated resource allocation mechanism is applied may be based on the SL mode of the NR or LTE technology, using the PC5 radio interface. In such cases the SL communication may be based on multiple physical channels defined on a physical (PHY) layer of the radio interface between the TX UE and the RX UE, including a Physical sidelink control channel (PSCCH), a Physical sidelink shared channel (PSSCH), a Physical sidelink feedback channel (PSFCH), and a Physical sidelink broadcast channel (PSBCH). The data decoded from the PHY layer may then be further processed by an MAC (Medium Access Control) entity of the RX UE.

The PSCCH carries only control information, usually referred to as the first-stage SCI (Sidelink Control Information). It is transmitted using a predefined format in predetermined radio resources, allowing a RX UE to use blind decoding. That is, a RX UE attempts to decode PSCCH according to the predefined format in the predetermined radio resources, without knowing beforehand whether a PSCCH was indeed transmitted or not. If the decoding operation succeeds, the RX UE assumes that a PSCCH was transmitted. Otherwise, it assumes no PSCCH was transmitted. The PSCCH carries information that is necessary to decode the PSSCH.

The PSSCH carries both control information and data payload. The control information is usually referred to as the second-stage SCI. It is transmitted using the radio resource allocation and transmission format indicated in PSCCH. It contains further information that is necessary to decode the data payload carried by PSSCH too.

The PSFCH carries only feedback information. The contents of PSFCH depends on the mode of HARQ operation. In some cases, both positive (also denoted as ACK) and negative (also denoted as NACK) acknowledgements are transmitted. In other cases, only NACK is transmitted. PSFCH transmission uses a predefined format and takes place in predetermined radio resources.

The PSBCH carries basic system configuration information, e.g., concerning bandwidth, TDD (time-division duplexing) configuration, or the like. Further, the PSBCH carries synchronization signals.

For the SL communication, a typical operation may be as follows: A first UE performs an SL transmission on the PSCCH and PSSCH. A second UE receives the SL transmission. Receiving the SL transmission may involve that, by means of blind decoding, the second UE detects the PSCCH and decodes the first-stage SCI carried by the PSCCH. If the blind decoding is successful, the second UE uses the decoded contents of the PSCCH to decode second-stage SCI carried by the PSSCH. Having decoded the second-stage SCI, the second UE uses the first-stage SCI and the second-stage SCI to decodes payload data carried by the PSSCH. Having successfully decoded the payload data, the second UE proceeds to transmit HARQ (Hybrid Automatic Repeat Request) feedback on the PSFCH. Different modes of providing the HARQ feedback may be utilized. The first UE expects to receive the HARQ feedback from the second UE and may use the presence and contents of the PSFCH to determine further actions, e.g., whether to perform a retransmission or not. Accordingly, the PSDCH may be is used to trigger actions related to HARQ operation for the SL transmission. The utilization of the HARQ feedback may also be omitted in some cases. For example, HARQ feedback is typically not utilized for SL transmissions in broadcast mode. The TX UE (e.g., the first UE in the considered example) may indicate in the SCI whether or not it expects the RX UE (e.g., the second UE in the considered example) to transmit the PSFCH with HARQ feedback.

The sensing-based resource allocation of the illustrated concepts can be based on the following principles, which are compatible with the sensing based resource allocation as for example specified of the NR technology and may include the following sub-processes:

a) The UE senses the transmission medium in the sensing window, which corresponds to a time interval [n−a, n−b], where n is a time reference depending on the current time, and a>b≥0 define the length, i.e., duration, of the sensing window.
b) Based on the sensing results, the UE predicts the future utilization of the transmission medium in the selection window corresponding to a future time interval [n+T1, n+T2], where T2>T1≥0.
c) The UE selects one or more time-frequency resources among the resources in the selection window that, based on the sensing results, are predicted to be selectable, e.g., idle or otherwise available.

Figure 4:
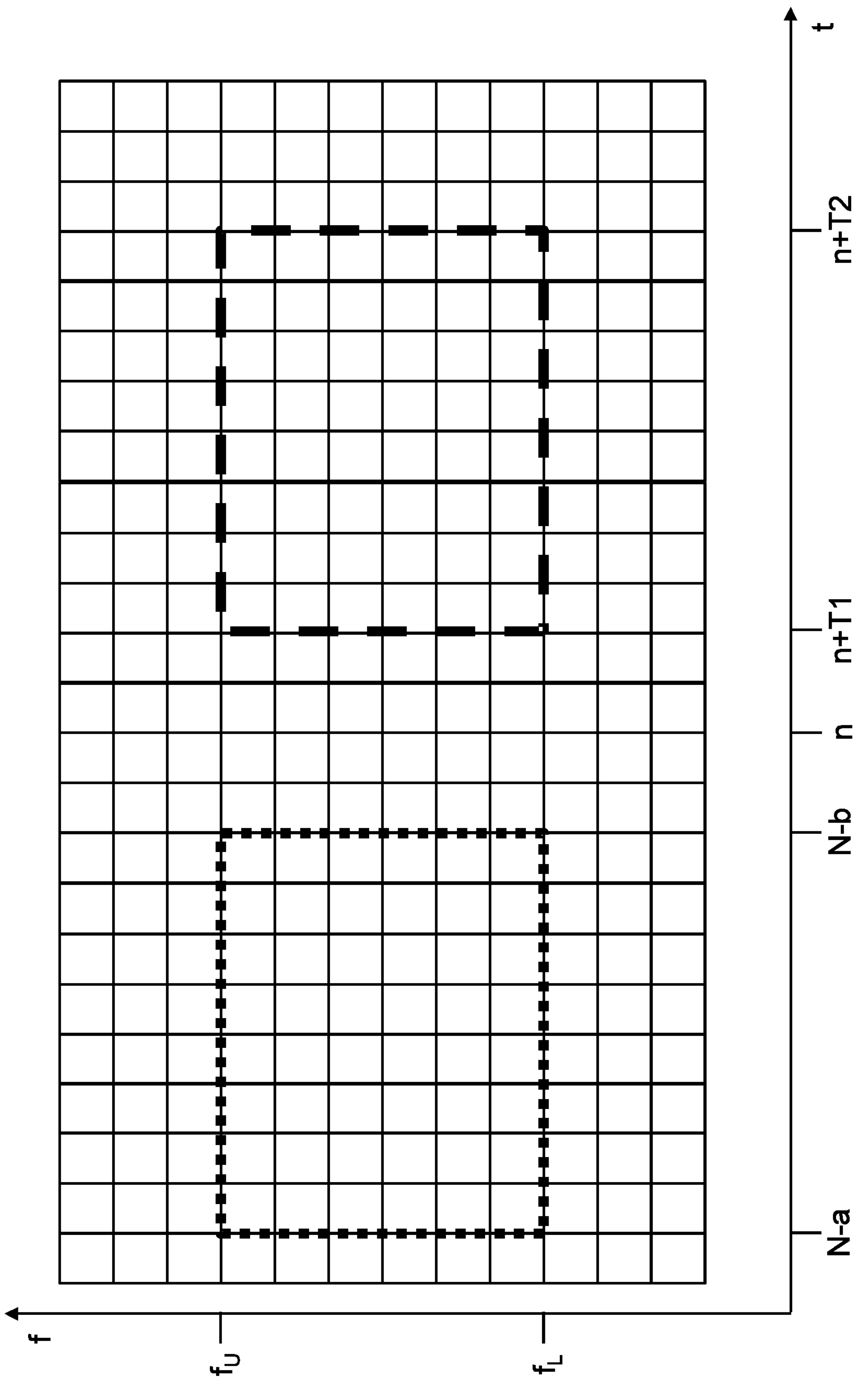
FIG. 4 schematically illustrates a selection window and a sensing window which may be subject to adaptation processes according to an embodiment.

FIG. 4 schematically illustrates the sensing window and the selection window in a time-frequency grid of radio resources. Here, it is noted that along the time coordinate t, the radio resources may be organized in symbols, slots, frames, and/or subframes. Along the frequency coordinate f, the radio resources may be organized in subcarriers, resource elements, resource blocks, sub-channels, bandwidth parts, and/or bands. The grid elements illustrated in FIG. 4 may for example each correspond to one slot along the time coordinate t and one resource element along the frequency coordinate f. In FIG. 4, the sensing window is illustrated by a box with dotted outline, and the selection window is illustrated by a box with dashed outline. In the illustrated example, the sensing window has time boundaries defined by the parameters a and b and the selection window has time boundaries defined by the parameters T1 and T2. Further, the selection window and the sensing window each have a width extending between a lower frequency boundary $f_L$ and an upper frequency boundary $f_U$, i.e., the selection window and the sensing window cover the same frequency resources. It is however noted that it would also be possible that the selection window and the sensing window differ with respect to the covered frequency sources. For example, the selection window could have a lower frequency boundary $f_{L1}$ and an upper frequency boundary $f_{U1}$, while the sensing window has a lower frequency boundary $f_{L2}$ and an upper frequency boundary $f_{U2}$, with $f_{L2}$ being different from $f_{L1}$ or $f_{U2}$ being different from $f_{U1}$. Further, it is noted that in some scenarios the selection window and/or the sensing window could have non-rectangular form or be non-contiguous. For example, the selection window or sensing window could consist of non-consecutive time slots. Such more complex forms may be regarded as a combination of rectangular window elements, and the illustrated concepts may also be applied to such more complex forms, e.g., by applying the illustrated adaption individually to each of the window elements.

In the following, the term “window for resource selection” may be used in a generic manner to refer to a set of time-frequency resources that is used for selecting resources to be used for a D2D transmission. This window for resource selection may correspond to the selection window, to the sensing window, or to a combination of the selection window and the sensing window. In some cases, the window may be denoted as “partial window”, thereby indicating that it has a size which is reduced as compared to a normal size of a selection window or sensing window.

Further, in the present disclosure the terms “normal sensing” and “partial sensing” may be used to distinguish resource selection procedures which use a partial window, e.g., partial sensing window and/or partial selection window, from other resource selection procedures refers to sensing using procedures based on a normal size of the sensing window and selection window. Here, the term partial sensing is used to denote the procedures which are based on a partial sensing window and/or partial selection window, and the term normal sensing is used to denote the procedures that are based on a normal size of the sensing window and selection window. Further, it is noted that the partial sensing may also include the case that the size of the partial sensing window is zero, i.e., that the resource selection procedure does not use sensing of the resources to predict their utilization in the selection window. In some cases, the normal sensing window can consist of consecutive time slots, while the partial sensing window consists of non-consecutive slots which are distributed over the normal sensing window.

In some cases, the sensing window may at least in part be defined by the selection window. For example, if the selection window include a set of resources $S_{selection,1}$, the sensing window may be required to include at least a part of the resources $S_{sensing,1}$. Similarly, if the sensing window consists of a certain set of resources $S_{sensing,2}$, the selection window may be required to include no more than a certain set of resources $S_{selection,2}$, i.e., the selection window may define an upper limit for the size of the sensing window. This may need to be considered in the adaptation of the sensing window and selection window. For example, when enlarging the selection window, it may also be required to enlarge the sensing window. Further, when reducing the size of the sensing window, it may also be required to reduce the size of the selection window.

Figure 5:
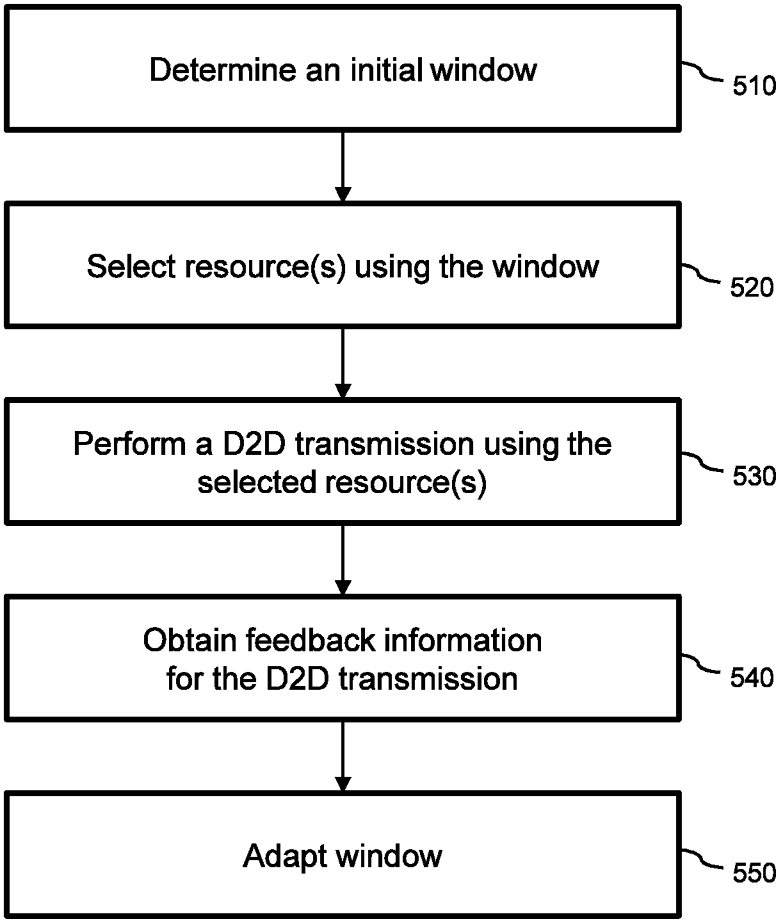
FIG. 5 schematically illustrates a procedure for adapting a window used in resource selection for D2D communication according to an embodiment.

FIG. 5 illustrates an example of a procedure for adaptation of the window for resource selection. As mentioned above, this window may correspond to the selection window or to the sensing window. The procedure of FIG. 5 may be part of an autonomous resource allocation procedure of a UE which intends to perform a D2D transmission, e.g., an SL transmission.

At step 510, the UE determines an initial configuration of the window for resource selection. For example, this may involve determining initial values of the above-mentioned parameters a, b, T1, T2, $f_{L1}$, $f_{U1}$, $f_{L2}$, or $f_{U2}$. This initial configuration may for example be based on configuration information received from a node of the wireless communication network, e.g., from an access node serving the UE. The configuration information may for example be provided by broadcasted system information, e.g., in an SIB (System Information Block) and/or by RRC signaling. The configuration information may also indicate parameters to be used for adapting the window for resource selection, e.g., a step size or one or more threshold values. Further, at least a part of the initial configuration of the window for resource selection and/or of the parameters to be used for adapting the window for resource selection may also be based on pre-configuration, e.g., based on a standard, network operator settings, and/or manufacturer settings.

The determination of the initial configuration of the window for resource selection may for example involve determining a number of time resources and/or frequency resources included in the window for resource selection or, more generally, determining the size of the window for resource selection. The size may be determined in terms of a specific value of the size, e.g., a specific number of resources. In addition or as an alternative, the size may be determined in terms of limits. For example, the initial configuration may specify an allowed range of the size. For example, the UE may be allowed to choose any size which is larger than a first size and is smaller than a second size. Here, it is to be noted that an allowed range can be specified in terms of an upper limit and a lower limit, or in terms of only one of these limits, e.g., by specifying that the window for resource selection shall not be smaller that a lower limit.

The determination of the initial configuration of the window for resource selection may also involve determining at least some of the boundaries of the window for resource selection. The boundaries may be determined in terms of specific values of the time boundaries and/or frequency boundaries. In addition or as an alternative, the boundaries may be determined in terms of limits. For example, the initial configuration may specify an allowed range of at least one or each time boundary, and allowed range of at least one or each frequency boundary, and/or an allowed range of the size. For example, the UE may be allowed to choose any selection window with starting time not later than $T1_{min}$ and end time not earlier than $T2_{min}$, or the UE may be allowed to choose any sensing window with starting time not later than $a_{min}$ and end time not earlier than $b_{min}$.

Step 510 may also involve determining a granularity of the window for resource selection. Here, the granularity may define the smallest possible unit of setting the window for resource selection, e.g., a smallest possible unit of setting the time boundaries and/or a smallest possible unit of setting the frequency boundaries. The granularity may also depend on characteristics of the underlying time-frequency grid. Also the granularity may be defined in terms of specific values, e.g., a time value and/or a frequency value, as well as in terms of limits or allowed ranges of values defining the granularity.

Step 510 may also involve determining a step size of adapting the window for resource selection. Here, the step size may define the size of the change of the window when performing the adaptation, e.g., in terms of a time step size and/or in terms of a frequency step size. The step size may be additive. For example, the size of the adapted window may then be determined by the current size plus the step size or the current size plus an adaptation value depending on the step size. Alternatively, the step size may be multiplicative. For example, the size of the adapted window may then be determined by the current size multiplied by the step size or the current size multiplied by an adaptation value depending on the step size. Also the step size may be defined in terms of specific values, e.g., a time value and/or a frequency value, as well as in terms of limits or allowed ranges of values defining the step size.

At step 520, the UE selects one or more resources to be used for the D2D transmission, using the window for resource selection as determined at step 520. If the window for resource selection corresponds to the sensing window, step 520 may involve that the UE performs sensing operations on the resources in the sensing window. The results from the sensing operations may then be used to determine the availability of the resources in a selection window. If the window for resource selection corresponds to the selection window, step 520 may involve that the UE selects the resource(s) to be used from the selection window.

At step 530, the UE performs a D2D transmission on the resource(s) selected at step 520, e.g., an SL transmission. The D2D transmission may for example convey a data packet and/or control information, e.g., SCI. The D2D transmission may be performed on a broadcast mode, in a groupcast mode, or in a unicast mode.

In some scenarios, the D2D transmission of step 530 also determines how to handle feedback for the D2D transmission, e.g., with respect to interpreting feedback information received from a recipient of the D2D transmission. For example, the D2D transmission may request the recipient to send feedback in the form of either an ACK or a NACK. This may for example apply if the D2D transmission is a unicast transmission or a groupcast transmission of the second variant where the recipient may provide feedback in the form of an HARQ-ACK or HARQ-NACK. Alternatively, the D2D transmission may indicate that the recipient shall provide the feedback in the form of NACK only. This may for example apply if the D2D transmission is a groupcast transmission of the first variant where the recipient may provide feedback only in the form of an HARQ-NACK. The handling of the feedback indicated by the D2D transmission may be considered in step 540.

At step 540, the UE obtains feedback information for the D2D transmission performed at step 530. In particular, the UE may receive a D2D transmission from the recipient of the D2D transmission, and this received D2D transmission may include feedback for the D2D transmission performed in step 530. The feedback may be in the form of HARQ feedback, i.e., in the form of an ACK or a NACK. However, other types of feedback could be considered as well, e.g., information about collisions related to the D2D transmission.

In some scenarios, the feedback information is obtained from a D2D transmission, e.g., SL transmission, received the recipient (or one of the recipients) of the D2D transmission performed in step 530. Alternatively, the feedback information may be obtained from a D2D transmission, e.g., an SL transmission, from a further UE that is not a recipient of the D2D transmission performed in step 530. For example, the further UE could have detected a collision caused by the D2D transmission performed at step 530 and send information indicating the detected collision. Alternatively or in addition, the feedback information could be obtained from a DL transmission received from a node of the wireless communication network, e.g., from an access node serving the UE. This may for example be the case if the access node controls HARQ feedback for SL transmissions.

In some scenarios, the feedback information may also be derived from not receiving an expected transmission containing HARQ feedback for the D2D transmission performed in step 530. This variant of determining HARQ feedback is sometimes referred to as HARQ-DTX. For example, it may occur that the D2D transmission of step 530 is not received or not decodable at the intended recipient, e.g., due to interference. As a consequence, the recipient would not send any feedback. The UE may then interpret that the absence of feedback as being equivalent to a NACK. In another example, the feedback may be provided only in the form of NACKs. Accordingly, the recipient will send an HARQ-NACK if the recipient is not able to decode the received D2D transmission, but will not send any feedback if the recipient is able to successfully decode the received D2D transmission.

In some scenarios, is the D2D transmission of step 530 is an SL transmission, at least a part of the feedback information may be received on the PSFCH. Further, at least a part of the feedback information may be received in SCI carried by the PSCCH, e.g., by first stage SCI, or the PSSCH, e.g., by second stage SCI.

At step 540, the UE adapts the window for resource selection depending on the feedback information obtained at step 530. This may involve newly determining or adjusting at least one of the parameters determined at step 510. This may result in incrementing or decrementing the previously used size of the window for resource selection. For example, if the feedback information obtained at step 540 indicates that the D2D transmission of step 530 was successful, e.g., if a HARQ-ACK is received at step 540, the size of the window for resource selection, e.g. the size of the sensing window and/or the size of the selection window, may be reduced. On the other hand, if the feedback information obtained at step 540 indicates that the D2D transmission of step 530 was not successful, e.g., if a HARQ-NACK or no feedback at all was received at step 540, the size of the window for resource selection, e.g., the size of the sensing window and/or the size of the selection window may be increased. The step size and/or granularity used in this adaption may be based on the configuration performed at step 510. In some case, the step size for adapting the window for resource selection can be UE specific, i.e., configured specifically for this UE. Alternatively, the step size may be resource pool specific, i.e., configured for the resource pool from which the UE selects the resource(s) for the D2D transmission.

In some scenarios, the UE may adapt the window for resource selection depending on whether the D2D transmission of step 530 way successful or not. This may be determined at step 540, based on receiving HARQ-ACK or HARQ-NACK, or on not receiving any HARQ feedback, i.e., HARQ-DTX. In some cases, for groupcast transmissions of the first variant, the UE may interpret receiving no HARQ feedback as indicating that the D2D transmission of step 530 was successful. In some other cases, e.g., for unicast transmissions or groupcast transmissions of the second variant, the UE may interpret receiving no HARQ feedback as indicating the transmission was unsuccessful.

In some scenarios, the UE may adapt the window for resource selection based on considering K consecutive transmissions. For example, if the UE receives K1 consecutive HARQ-ACK and/or HARQ-DTX, with the HARQ DTX being interpreted as indicating a successful transmission, the UE may decrease the size of the window for resource selection, e.g., the size of the sensing window and/or the size of the selection window. Similarly, if the UE receives K consecutive HARQ-NACK and/or HARQ-DTX, with the HARQ DTX being interpreted as indicating an unsuccessful transmission, the UE may increase the size of the window for resource selection, e.g., the size of the sensing window and/or the size of the selection window. The value of K1 may be based configuration or pre-configuration, e.g., based on a standard, network operator settings, and/or manufacturer settings. Further, the value of K1 could be configured at step 510, i.e., as part of the parameters for adaptation. In some cases, the value of K may be K1=1. In some cases, the value of K1 may correspond to a maximum allowed number of retransmissions. In some cases, the UE may also be configured with an allowed range of values of K1, e.g., based on a standard, network operator settings, and/or manufacturer settings.

In some scenarios, the UE may adapt the window for resource selection, e.g., the sensing window and/or the selection window, by decreasing its size if no HARQ-NACK is received for K consecutive data transmissions. The value of K2 can also be K2=1. The value of K2 may be based configuration or pre-configuration, e.g., based on a standard, network operator settings, and/or manufacturer settings. Further, the value of K2 could be configured at step 510, i.e., as part of the parameters for adaptation. In some cases, the UE may adapt the window for resource selection, e.g., the sensing window and/or the selection window, by increasing its size if at least K3 HARQ-NACK are received within a certain time interval. The value of K3 can also be K3=1. The value of K3 may be based configuration or pre-configuration, e.g., based on a standard, network operator settings, and/or manufacturer settings. Further, the value of K3 could be configured at step 510, i.e., as part of the parameters for adaptation. This time interval may be based configuration or pre-configuration, e.g., based on a standard, network operator settings, and/or manufacturer settings. Further, the time interval could be configured at step 510, i.e., as part of the parameters for adaptation.

In some scenarios, the UE may adapt the window for resource selection, e.g., the sensing window and/or the selection window, by decreasing its size if no HARQ-NACK is received within a certain time interval. This time interval may be based configuration or pre-configuration, e.g., based on a standard, network operator settings, and/or manufacturer settings. Further, the time interval could be configured at step 510, i.e., as part of the parameters for adaptation.

In some scenarios, the UE may adapt the window for resource selection, e.g., the sensing window and/or the selection window, in response to receiving a consecutive number K4 of HARQ-ACK/NACK in a time interval which is proportional to the window for sensing or resource selection. This time interval may be based configuration or pre-configuration, e.g., based on a standard, network operator settings, and/or manufacturer settings. Further, the time interval could be configured at step 510, i.e., as part of the parameters for adaptation. The value of K4 may be based configuration or pre-configuration, e.g., based on a standard, network operator settings, and/or manufacturer settings. Further, the value of K4 could be configured at step 510, i.e., as part of the parameters for adaptation.

In some scenarios, the UE may adapt the window for resource selection, e.g., the sensing window and/or the selection window, based on a comparison to a threshold. For example, based on the feedback information obtained at step 540, the UE may determine that an error probability is above a threshold and decrease the size of the window for resource selection, e.g., the size of the sensing window and/or the size of the selection window. If in turn the comparison yields that the error probability is below the threshold, the UE may decrease the size of the window for resource selection. In some cases, the comparison may be performed with respect to multiple thresholds. These may be defined for different levels of QoS (Quality of Service), e.g., corresponding to different priorities of data packets conveyed by the D2D transmissions. The threshold(s) may be based on configuration or pre-configuration, e.g., based on a standard, network operator settings, and/or manufacturer settings. Further, the threshold could be configured at step 510, i.e., as part of the parameters for adaptation.

In some scenarios, the UE may apply the same step size for increasing and decreasing the size of the window for resource selection, e.g., the size of the sensing window and/or the size of the selection window. For example, the adaption of step 540 may involve that the length of sensing window and the length of the selection window are both increased by a step size of X, e.g., 100 ms, or that alternatively the length of sensing window and the length of the selection window are decreased by the same step size of X. The step size X may be an absolute time value or may be a relative value, e.g., defining a percentage of the current length of the sensing window and the current length of the selection window. The value of X may be based on configuration or pre-configuration, e.g., based on a standard, network operator settings, and/or manufacturer settings. Further, the value of X could be configured at step 510, i.e., as part of the parameters for adaptation.

In some scenarios, the UE may apply different step sizes for increasing and decreasing the size of the window for resource selection, e.g., the size of the sensing window and/or the size of the selection window. For example, the adaption of step 540 may involve that the length of sensing window and the length of the selection window are both increased by a step size of X1, e.g., 100 ms, or that alternatively the length of sensing window and the length of the selection window are both decreased by a different step size of X2. The step sizes X1 and X2 may each be an absolute time value or may each be a relative value, e.g., defining a percentage of the current length of the sensing window and the current length of the selection window. The values of X1 and X2 may be based configuration or pre-configuration, e.g., based on a standard, network operator settings, and/or manufacturer settings. Further, the values of X1 and X2 could be configured at step 510, i.e., as part of the parameters for adaptation.

In some scenarios, the UE may apply a variable step size for adapting the window for resource selection, e.g., the sensing window and/or the selection window. For example, a first time that the window for resource selection is adapted, the adaptation may involve adding or removing N1 resources or multiplying the size of the window by M1. A second time that the window for resource selection is adapted, the adaptation may involve adding or removing N2 resources or multiplying the size of the window by M2. A third time that the window for resource selection is adapted, the adaptation may involve adding or removing N3 resources or multiplying the size of the window by M3. Here, the first time, second time, and third times may correspond to consecutive adaptations. The values N1, N2, and N3 or the values M1, M2, and M3 are different from each other, e.g., may be incremented or decremented with each adaptation. Accordingly the variable step size may be a function of previously performed adaptations. A timer may be used to return the variable step size to its initial value. The initial value of the step size and/or parameters for controlling the variation of the step size, e.g., a setting of the timer, an increment value, or a decrement value, may be based configuration or pre-configuration, e.g., based on a standard, network operator settings, and/or manufacturer settings. Further, the initial value of the step size and/or parameters for controlling the variation of the step size, e.g., a setting of the timer, an increment value, or a decrement value, may be could be configured at step 510, i.e., as part of the parameters for adaptation.

In some scenarios, the UE may adapt the window for resource selection, e.g., the size of the sensing and/or the size of the selection window, based on a congestion metric, a channel busy ratio (CBR) of the transmission medium or resources of the transmission medium which at least in part correspond to the resources considered in the resource selection procedure. For example, if the congestion metric increases, the UE may increase the size of the window for resource selection, e.g., the size of the sensing and/or the size of the selection window, and if the congestion metric increases, the UE may decrease the size of the window for resource selection, e.g., the size of the sensing and/or the size of the selection window. In some scenarios, the UE could measure the congestion metric, e.g., by monitoring the sensing window.

In some scenarios, the UE may adapt the window for resource selection, e.g., the size of the sensing and/or the size of the selection window, based on a priority of a D2D transmission to be performed on the resources which are being selected, e.g., based on a priority of a data packet to be conveyed by the D2D transmission. For example, if the data packet to be conveyed has a high priority, e.g., above a threshold, the UE may adapt the window for resource selection, e.g., the sensing and/or the selection window, by increasing its size. If the data packet to be conveyed has a low priority, e.g., below a threshold, the UE may adapt the window for resource selection, e.g., the sensing and/or the selection window, by decreasing its size.

In some scenarios, the UE may adapt the window for resource selection, e.g., the size of the sensing and/or the size of the selection window, based on a power status, e.g., a remaining battery lifetime, of the UE. For example, if remaining battery lifetime of the UE is high, e.g., above a first threshold, the UE may adapt the window for resource selection, e.g., the sensing and/or the selection window, by increasing its size. If remaining battery lifetime of the UE is low, e.g., below a second threshold, the UE may adapt the window for resource selection, e.g., the sensing and/or the selection window, by decreasing its size.

In some scenarios, the UE may adapt the window for resource selection, e.g., the size of the sensing and/or the size of the selection window, based on priorities of D2D transmissions, e.g., SL transmissions, received from other UEs. The priority of each received D2D transmission may for example be indicated by its associated SCI. For example, if a UE receives SCI indicating a high priority, e.g., above a threshold or some other reference priority, the UE may increase the size of the window for resource selection, e.g., the size of the sensing window and/or the size of the selection window. In this way, the UE may reduce the risk of collisions with high priority D2D traffic generated by other UEs. In some cases, the SCI or other control information associated with the D2D transmissions may include an indication whether the D2D transmission relates to high priority traffic, such as URLLC (Ultra Reliable Low Latency) traffic, e.g., in the form of a flag. The UE may then increase the size of the window for resource selection, e.g., the size of the sensing and/or the size of the selection window, in response to detecting such indication or flag in D2D transmissions from other UEs. In some case, the UE may also consider a relation or difference of the priorities of the received D2D transmissions to the priority of a D2D transmission to be performed on the resources being selected. For example, the UE may decrease the size of the window for resource selection, e.g., the size of the sensing and/or the size of the selection window, in response to the D2D transmission to be performed by the UE being lower than the priorities of D2D transmissions from the other UEs, or the UE may increase the size of the window for resource selection, e.g., the size of the sensing and/or the size of the selection window, in response to the priority of the D2D transmission to be performed by the UE being higher than the priorities of D2D transmissions from the other UEs.

In such scenarios considering the priorities of D2D transmissions from other UEs, these priorities may also be combined by averaging over time and/or a group of UEs or by other types of filtering. Similar averaging or filtering may also be applied to D2D transmissions performed by the UE. The averaged or otherwise filtered priority values may then be used as input for the adaptation. For example, in some cases the priorities of the D2D transmissions performed by the UE could be averaged or otherwise filtered over a time interval, e.g., by using a moving average filter, and the same filtering over the time interval could be applied to the priorities of the D2D transmissions received by the UE from other UEs, and the resulting filtered priority values may then be used as input for the adaptation. Further, in some cases the difference of priorities of the D2D transmissions performed by the UE could be to the priorities of the D2D transmissions received by the UE from other UEs could be averaged or otherwise filtered over a time interval, e.g., by using a moving average filter, the resulting filtered priority difference may then be used as input for the adaptation.

In such scenarios, the adaptation of the window for resource selection may be based on an adjustment time interval. The adjustment time interval may limit the number of allowed adaptations. For example, the adjustment time interval may define that no more than P adaptations of the window for resource selection are allowed in the adjustment time interval. The value of P and/or the duration of the adjustment time interval may be based configuration or pre-configuration, e.g., based on a standard, network operator settings, and/or manufacturer settings. Further, value of P and/or the duration of the adjustment time interval could be configured at step 510, i.e., as part of the parameters for adaptation.

It is to be noted that the above-mentioned inputs for performing the adaptation of the window for resource selection, e.g. of the selection window and/or of the sensing window, may be used alone or in combination with each other. For example, the adaptation based on the feedback information may or may not be be combined with the adaptation based on the congestion information and/or the adaptation based on the priority or priorities. Further, the adaptation based one the congestion information may be combined with the adaptation based on the priority or priorities. For example, different sizes of the sensing window could be configured or pre-configured for different thresholds for the congestion level and different thresholds for the priority of a D2D transmission to be sent and/or different thresholds for priorities of received D2D transmissions. In some scenarios, the adaptation may also be performed based on the congestion information and/or the adaptation based on the priority or priorities, without considering the feedback information as input of the adaptation process.

The procedure of FIG. 5 may be applied with respect to the sensing window and/or the selection window of partial sensing. In this case, the partial sensing based resource selection procedure may also be combined with normal sensing. In particular, the UE may be configured with a first mode of operation corresponding to utilization of the partial sensing for allocating the resource used for the D2D communication, e.g., partial sensing with adaptation of the sensing window and/or selection window according to the procedure of FIG. 5, and a second mode of operation corresponding to utilization of the normal sensing for allocating the resource used for the D2D communication. The UE may then switch between the first mode of operation and the second mode of operation, e.g., depending on priorities of D2D transmissions received from other UEs and/or D2D transmissions performed by the UE.

For example, the UE may switch to the normal sensing based second mode of operation if the priorities of the received D2D transmissions are above a threshold. Theses priorities may also be combined by averaging over time and/or a group of UEs or by other types of filtering, and the switching may then be based on the resulting filtered priorities. The threshold can be based configuration or pre-configuration, e.g., based on a standard, network operator settings, and/or manufacturer settings. Further, the threshold can be configured by a network node, e.g., based on configuration information received from a node of the wireless communication network, e.g., from an access node serving the UE. The configuration information may for example be provided by broadcasted system information, e.g., in an SIB and/or by RRC signaling.

For example, the UE may switch to the partial sensing based first mode of operation if the priorities of the D2D transmissions performed by the UE are below a threshold. These priorities may also be combined by averaging over time and/or a group of UEs or by other types of filtering, and the switching may then be based on the resulting filtered priorities. The threshold can be based configuration or pre-configuration, e.g., based on a standard, network operator settings, and/or manufacturer settings. Further, the threshold can be configured by a network node, e.g., based on configuration information received from a node of the wireless communication network, e.g., from an access node serving the UE. The configuration information may for example be provided by broadcasted system information, e.g., in an SIB and/or by RRC signaling.

In some scenarios, the UE may switch to the partial sensing based first mode of operation if it detects indications of high priority traffic in received D2D transmissions, e.g., if SCI or other control information associated with the received D2D transmissions indicates that these correspond to URLLC traffic.

In some scenarios, the UE may also use a congestion metric as input for controlling switching between the first mode of operation and the second mode of operation. For example, the UE may switch to the partial sensing based first mode of operation if the congestion metric is low, e.g., below a threshold. Otherwise the UE may use the second mode of operation. The threshold can be based configuration or pre-configuration, e.g., based on a standard, network operator settings, and/or manufacturer settings. Further, the threshold can be configured by a network node, e.g., based on configuration information received from a node of the wireless communication network, e.g., from an access node serving the UE. The configuration information may for example be provided by broadcasted system information, e.g., in an SIB and/or by RRC signaling.

Figure 6:
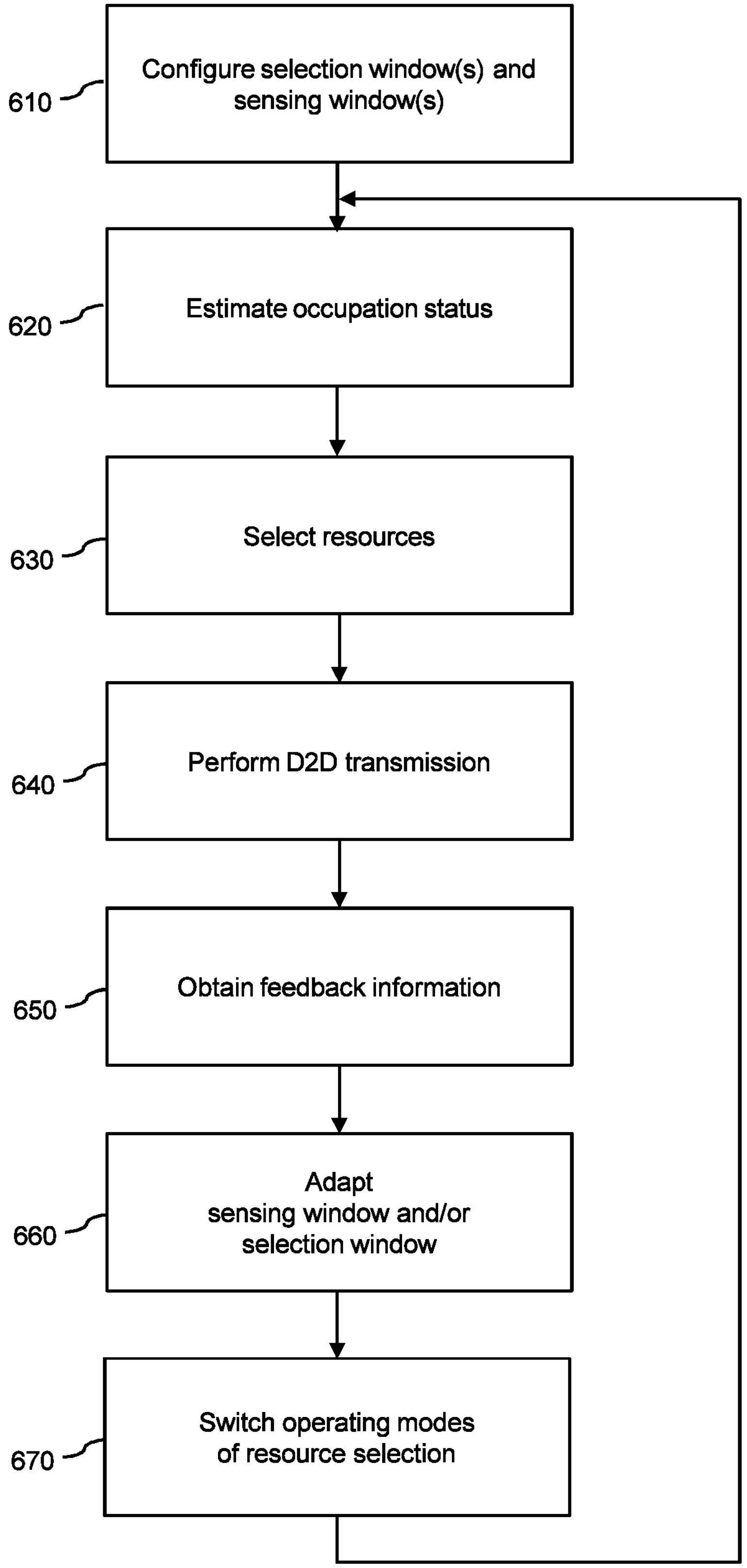
FIG. 6 shows a flowchart for schematically illustrating a method according to an embodiment.

In some scenarios, the settings of the sensing window are dependent on the selection window, or the setting of the selection window is dependent on the sensing window or vice versa. For example, for only one of the selection window and the sensing window, the settings may be configured and/or adapted as explained above, and the settings of the other may be derived from these settings. For example, there could be no explicit configuration or pre-configuration of the size of the selection window, and the UE could derive the size of the selection window from the size of the sensing window. Similarly, there could be no explicit configuration or pre-configuration of the size of the sensing window, and the UE could derive the size of the sensing window from the size of the selection window FIG. 6 shows a flowchart for illustrating a method, which may be utilized for implementing the illustrated concepts. The method of FIG. 6 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well. The wireless communication device may for example be a UE for public safety operations, a UE that is mounted on a vehicle or is part of a vehicle. Such vehicle may be a car, a motorcycle, a drone, a bike, or the like.

If a processor-based implementation of the wireless communication device is used, at least some of the steps of the method of FIG. 6 may be performed and/or controlled by one or more processors of the wireless communication device. Such wireless communication device may also include a memory storing program code for implementing at least some of the below described functionalities or steps of the method of FIG. 6.

At step 610, the wireless communication device configures a selection window and a sensing window. The selection window indicates radio resources allowed to be selected by the wireless communication device for a D2D transmission by the wireless communication device and the sensing window indicating which radio resources are to be used for estimating an occupation status of the radio resources in the selection window. The D2D transmission may for example be an SL transmission, e.g., based on the PC5 interface of the LTE technology or on the PC5 interface of the NR technology. In some cases, the selection window and the sensing window may be a partial selection window and a partial sensing window, respectively. In this case, step 610 may involve that the wireless communication device also configures a normal selection window and a normal sensing window, with the partial selection window being sub-part of the normal selection window and the partial sensing window being sub-part of the normal sensing window.

At step 620, by monitoring the radio resources indicated by the sensing window, the wireless communication device estimates the occupation status of the radio resources in the selection window. This typically involves using the monitoring to predict which resources from the selection window are available to be by the wireless communication device, e.g., not reserved.

At step 630, based on the estimated occupation status of the radio resources in the selection window, the wireless communication device selects radio resources from the selection window. The selection involves selecting the resources among those which are predicted to be available.

At step 640, using the selected radio resources, the wireless communication device performs at least one D2D transmission to at least one further wireless communication device. The D2D transmission may be an SL transmission. The D2D transmission may be performed in a unicast mode, in a groupcast mode, or in a broadcast mode.

At step 650, the wireless communication device obtains feedback information related to the at least one performed D2D transmission.

In some scenarios, the feedback information may include acknowledgement feedback for the at least one D2D transmission performed at step 640, e.g., HARQ feedback. In the case of SL communication, the acknowledgement feedback may be received on a PSFCH.

The acknowledgement feedback may include one or more indications of successful reception of the at least one D2D transmission by the at least one further wireless communication devices. At least one of the indications the indications of successful reception may be based on a positive acknowledgement feedback message received by the wireless communication device, e.g., on a received HARQ ACK. The positive acknowledgement feedback message can be received from another wireless communication device or from an access node serving the wireless communication device. Further, at least one of the indications of successful reception may be based on interpreting absence of an expected acknowledgement feedback message as an indication of successful reception.

Further, the acknowledgement feedback may include one or more indications of unsuccessful reception of the at least one D2D transmission by the at least one further wireless communication device. At least one of the indications of successful reception may be based on a negative acknowledgement feedback message received by the wireless communication device, e.g., on a received HARQ NACK. The negative acknowledgement feedback message can be received from another wireless communication device or from an access node serving the wireless communication device. Further, at least one of the indications of successful reception may be based on interpreting absence of an expected acknowledgement feedback messages as an indication of unsuccessful reception.

At step 660, the wireless communication device adapts at least one of the sensing window and the selection window. This adaptation is performed based on the feedback information obtained at step 650.

The adaptation of step 660 may involve adapting at least one of a size of the sensing window and a size of the selection window, e.g., by adapting one or more of the above-mentioned parameters a, b, T1, T2, $f_{L1}$, $f_{U1}$, $f_{L2}$, $f_{U2}$. Here, adapting the size of the sensing window may involve adapting a length of a time interval covered by the sensing window, i.e., the length of the sensing window, or adapting the size of the selection window may involve adapting a length of a time interval covered by the selection window, i.e., the length of the selection window. Further, adapting the size of the sensing window may involve adapting a width of a of a frequency range covered by the sensing window, i.e., i.e., the width of the sensing window, or adapting the size of the selection window comprises adapting a width of a frequency range covered by the selection window, i.e., the width of the sensing window.

In some scenarios, the adaptation of step 660 may involve adapting at least one of a position of the sensing window and a position of the selection window, e.g., by adapting one or more of the above-mentioned parameters a, b, T1, T2, $f_{L1}$, $f_{U1}$, $f_{L2}$, and $f_{U2}$. Here, adapting the position of the sensing window may involve adapting at least one of a starting time and an end time of the sensing window, e.g., by adapting one or more of the above-mentioned parameters a and b, or adapting the position of the selection window may involve adapting at least one of a starting time and an end time of the selection window, e.g., by adapting at least one of the above-mentioned parameters T1, T2. Further, adapting the position of the sensing window may involve adapting at least one of an upper frequency bound and a lower frequency bound of the sensing window, e.g., by adapting at least one of the above-mentioned parameters $f_{L1}$ and $f_{U1}$, or adapting the position of the selection window may involve adapting at least one of an upper frequency bound and a lower frequency bound of the selection window, e.g., by adapting at least one of the above-mentioned parameters $f_{L2}$ and $f_{U2}$.

In some scenarios, the adaptation of step 660 may involve that the sensing window and the selection window are adapted differently or independently of each other. For example, the sensing window and the selection window could be adapted using different step sizes. Further, only one of the sensing window and the selection window could be adapted, while the other is left un-adapted.

In some scenarios, the adaptation of step 660 may also involve adapting at least one of a step size for adapting the sensing window and a step size for adapting the selection window. In each case, the step size may be adapted based on the obtained feedback information. The adaptation of step 660 may thus be based on a variable step size.

In some scenarios, the adaptation of step 660 may also involve adapting at least one of a granularity for adapting the sensing window and a granularity for adapting the selection window. Here, the granularity defines a smallest unit of the adaptation, e.g., a smallest possible change in size, a smallest possible change in position, a smallest possible change in width, or a smallest possible change in length. The step size of the adaptation may correspond to the granularity or be larger than the granularity.

In some scenarios, the adaptation of step 660 may also involve that the adaptation is based on previous adaptation of at least one of the sensing window and the selection window. For example, the adaptation may be based on a variable step size, with the step size being incremented or decremented with each adaptation. In some cases, expiry of a timer may reset the step size to an initial value.

In some cases, the feedback information may include acknowledgement feedback with one or more indications of successful reception of the at least one D2D transmission by the at least one further wireless communication device. The adaptation of step 660 may then involve that, in response to the one or more positive acknowledgement feedback messages, the wireless communication device reduces a size of the sensing window and/or a size of the selection window. In some cases, the adaptation may involve that, in response to a number of the one or more indications of successful reception exceeding a threshold, the wireless communication device reduces the size of the sensing window and/or the size of the selection window. This number of indications of successful description may be counted per time interval. This time interval and/or the threshold may be configurable.

In some cases, the feedback information may include acknowledgement feedback with one or more indications of unsuccessful reception of the at least one D2D transmission by the at least one further wireless communication device. The adaptation of step 660 may then involve that, in response to the one or more indications of unsuccessful reception, the wireless communication device increases a size of the sensing window and/or a size of the selection window. In some cases, the adaptation may involve that, in response to a number of the one or more indications of unsuccessful reception exceeding a threshold, the wireless communication device increases the size of the sensing window and/or the size of the selection window. This number of indications of unsuccessful description may be counted per time interval. This time interval and/or the threshold may be configurable.

In some scenarios, the adaptation of step 660 may further be based on congestion information indicating a congestion level of radio resources to be used for a D2D transmission by the wireless communication device, e.g., in terms of a CBR. In this case the adaptation of step 660 may involve that, in response to the congestion level being high, e.g., above a threshold, the wireless communication device increases a size of the sensing window and/or a size of the selection window. In addition or as an alternative, the adaptation of step 660 may involve that, in response to the congestion level being low, e.g., below a threshold, the wireless communication device reduces a size of the sensing window and/or a size of the selection window.

In some scenarios, the adaptation of step 660 may further be based on a remaining power supply capacity of the wireless communication device, e.g., a remaining battery lifetime. In this case the adaptation of step 660 may involve that, in response to the remaining power supply capacity being high, e.g., above a threshold, the wireless communication device increases a size of the sensing window and/or a size of the selection window. In addition or as an alternative, the adaptation of step 660 may involve that, in response to the remaining power supply capacity being low, e.g., below a threshold, the wireless communication device reducing a size of the sensing window and/or a size of the selection window.

In some scenarios, the adaptation of step 660 may further be based on a priority of a further D2D transmission to be performed by the wireless communication device. In this case the adaptation of step 660 may involve that, in response to the priority of the further D2D transmission being high, e.g., above a threshold or some other priority reference, the wireless communication device increases a size of the sensing window and/or a size of the selection window. In addition or as an alternative, the adaptation of step 660 may involve that, in response to the priority of the further D2D transmission being low, e.g., below a threshold or some other priority reference, the wireless communication device reduces a size of the sensing window and/or a size of the selection window.

In some scenarios, the adaptation of step 660 may further be based on priorities of D2D transmissions received by the wireless communication device. The priorities of the received D2D transmissions may be indicated by SCI or other control information associated with each of the received D2D transmissions, e.g., in terms of a priority field or by an indication or flag that the D2D transmission corresponds to high priority traffic, e.g., URLLC traffic. In such scenarios, the adaptation of step 660 may involve that, in response to the priorities of the received D2D transmissions being high, e.g., above a threshold or some other priority reference, the wireless communication device increases a size of the sensing window and/or a size of the selection window. In addition or as an alternative, the adaptation of step 660 may involve that, in response to the priorities of the received D2D transmissions being low, e.g., below a threshold or some other priority reference, the wireless communication device reduce a size of the sensing window and/or a size of the selection window.

In some cases the above-mentioned priority reference may be defined by other D2D transmissions. For example, the adaptation of step 660 may involve that, based on a relation or difference of, on the one hand, a priority of one or more further D2D transmissions performed or to be performed by the wireless communication device to, on the other hand, priorities of D2D transmissions received by the wireless communication device. In such scenarios, the adaptation of step 660 may involve that in response to the priority of the further D2D transmission to be performed being lower than the priorities of D2D transmissions received by the wireless communication device, the wireless communication device reduces a size of the sensing window and/or a size of the selection window. In addition or as an alternative, the adaptation of step 660 may involve that, in response to the priority of the further D2D transmission to be performed being higher than the priorities of D2D transmissions received by the wireless communication device, the wireless communication device increasing a size of the sensing window and/or a size of the selection window.

In each of the above-mentioned cases considering the priorities of the received D2D transmissions, the adaptation of step 660 may be based on averaging of the priorities of the received D2D transmissions, e.g., by using a moving window averaging filter or some other filter to combine the priorities of multiple received D2D transmissions.

In some scenarios, the adaptation of step 660 may be limited to a predefined maximum number of adaptations per time interval. This may for example be achieved by defining an adjustment time interval and a maximum allowed number of adaptations in the adjustment time interval.

In some scenarios, the method of FIG. 6 may be used for adaptation of a partial sensing window used in partial sensing. The wireless communication device may then also be configured to perform normal sensing. In other words, in a first mode of operation, the wireless communication device selects radio resources for one or more D2D transmissions by the wireless communication device based on the selection window and the sensing window. In a second mode of operation, the wireless communication device selects radio resources for one or more D2D transmissions by the wireless communication device based on a further selection window and a further sensing window, the further selection window indicating radio resources allowed to be selected by the wireless communication device for a D2D transmission by the wireless communication device and the further sensing window indicating which radio resources are to be used for estimating an occupation status of the radio resources in the selection window. The selection window may then corresponds to a part of the further selection window, i.e., be a partial selection window. Similarly, the sensing window may correspond to a part of the further sensing window, i.e., be a partial sensing window. The further selection window and the further sensing window then correspond to the normal selection window and the normal sensing window, respectively.

At step 670, if the wireless communication device is configured with the first mode of operation and the second mode of operation, the wireless communication device may switch between the first mode of operation and the second mode of operation. For example, the wireless communication device may control the switching between the first mode of operation and the second mode of operation based on priorities of D2D transmissions received by the wireless communication device. The priorities of the received D2D transmissions may be indicated by SCI or other control information associated with each of the received D2D transmissions, e.g., in terms of a priority field or by an indication or flag that the D2D transmission corresponds to high priority traffic, e.g., URLLC traffic. For example, the wireless communication device may switch to the second mode of operation in response to the priority of one or more received D2D transmissions being high, e.g. above a threshold.

Further, the wireless communication device may control the switching between the first mode of operation and the second mode of operation based on based on priority of one or more D2D transmissions performed or to be performed by the wireless communication device. For example, the wireless communication device may switch to the first mode of operation in response to the priority of a D2D transmission to be transmitted being low, e.g. below a threshold.

Further, the wireless communication device may control the switching between the first mode of operation and the second mode of operation based on congestion information indicating a congestion level of radio resources to be used for a D2D transmission by the wireless communication device, e.g., in terms of a CBR. For example, the wireless communication device may switch to the first mode of operation in response to the congestion level being low, e.g. below a threshold.

Figure 7:
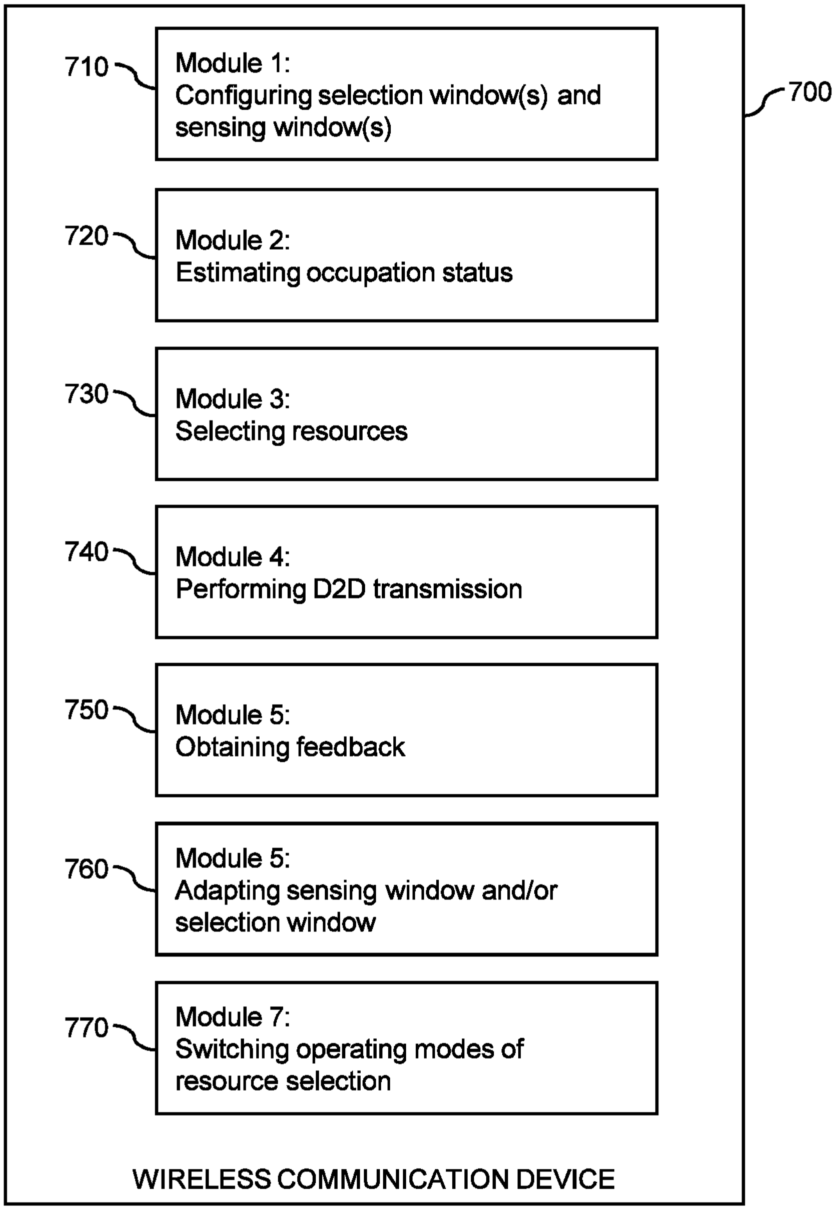
FIG. 7 shows an exemplary block diagram for illustrating functionalities of a wireless communication device implementing functionalities corresponding to the method of FIG. 6.

FIG. 7 shows a block diagram for illustrating functionalities of a wireless communication device 700 which operates according to the method of FIG. 6. The wireless communication device 700 may for example correspond to any of the above-mentioned UEs. As illustrated, the wireless communication device 700 may be provided with a module 710 configured to configure selection window(s) and sensing window(s), such as explained in connection with step 610. Further, the wireless communication device 700 device may be provided with a module 720 configured to estimate an occupation status, such as explained in connection with step 620. Further, the wireless communication device 700 may be provided with a module 730 configured to select resources, such as explained in connection with step 630.

Further, the wireless communication device 700 may be provided with a module 740 configured to perform a D2D transmission, such as explained in connection with step 640. Further, the wireless communication device 700 may be provided with a module 750 configured to obtain feedback information, such as explained in connection with step 650. Further, the wireless communication device 700 may be provided with a module 760 configured to adapt at the selection window and/or the sensing window, such as explained in connection with step 660. Further, the wireless communication device 700 may optionally be provided with a module 770 configured to switch between operating modes of resource selection, such as explained in connection with step 670.

It is noted that the wireless communication device 700 may include further modules for implementing other functionalities, such as known functionalities of a UE in the LTE and/or NR radio technology. Further, it is noted that the modules of the wireless communication device 700 do not necessarily represent a hardware structure of the wireless communication device 700, but may also correspond to functional elements, e.g., implemented by hardware, software, or a combination thereof.

Figure 8:
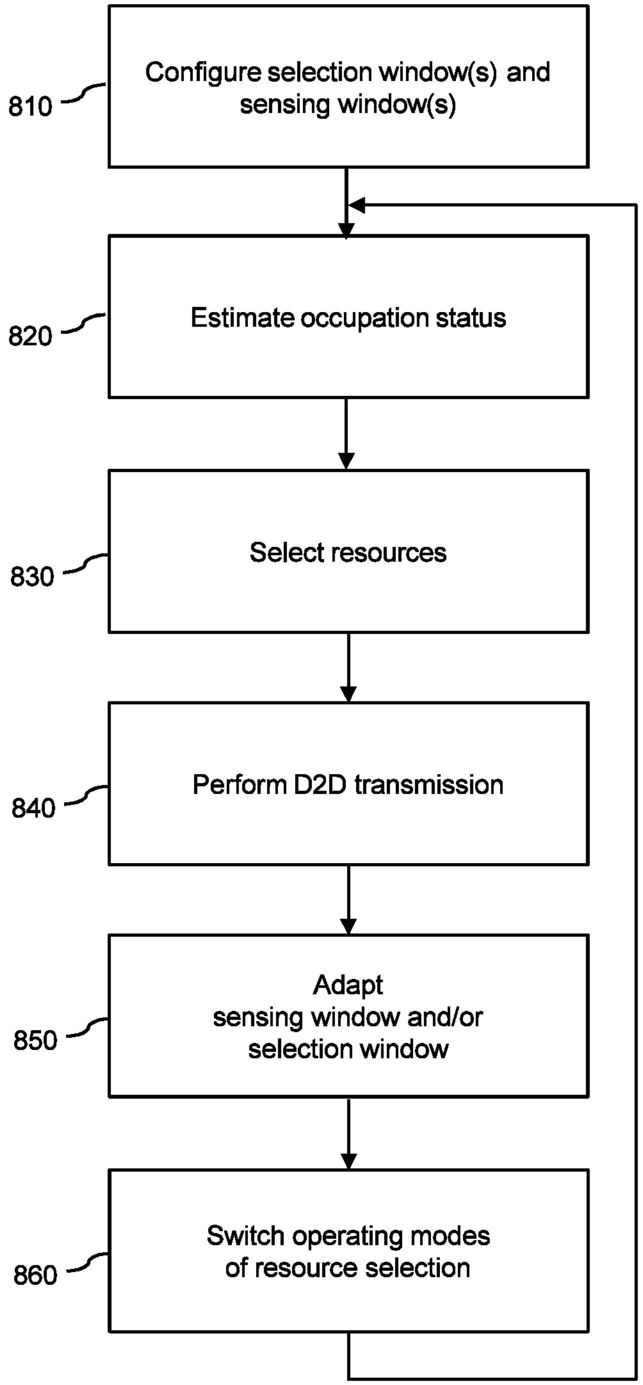
FIG. 8 shows a flowchart for schematically illustrating a further method according to an embodiment.

FIG. 8 shows a flowchart for illustrating a method, which may be utilized for implementing the illustrated concepts. The method of FIG. 8 may be used for implementing the illustrated concepts in a wireless communication device, e.g., corresponding to any of the above-mentioned UEs. In some scenarios, the wireless communication device may be a vehicle or vehicle-mounted device, but other types of WD, e.g., as mentioned above, could be used as well. The wireless communication device may for example be a UE for public safety operations, a UE that is mounted on a vehicle or is part of a vehicle. Such vehicle may be a car, a motorcycle, a drone, a bike, or the like.

If a processor-based implementation of the wireless communication device is used, at least some of the steps of the method of FIG. 8 may be performed and/or controlled by one or more processors of the wireless communication device. Such wireless communication device may also include a memory storing program code for implementing at least some of the below described functionalities or steps of the method of FIG. 8.

At step 810, the wireless communication device configures a selection window and a sensing window. The selection window indicates radio resources allowed to be selected by the wireless communication device for a D2D transmission by the wireless communication device and the sensing window indicating which radio resources are to be used for estimating an occupation status of the radio resources in the selection window. The D2D transmission may for example be an SL transmission, e.g., based on the PC5 interface of the LTE technology or on the PC5 interface of the NR technology. In some cases, the selection window and the sensing window may be a partial selection window and a partial sensing window, respectively. In this case, step 610 may involve that the wireless communication device also configures a normal selection window and a normal sensing window, with the partial selection window being sub-part of the normal selection window and the partial sensing window being sub-part of the normal sensing window.

At step 820, by monitoring the radio resources indicated by the sensing window, the wireless communication device estimates the occupation status of the radio resources in the selection window. This typically involves using the monitoring to predict which resources from the selection window are available to be by the wireless communication device, e.g., not reserved.

At step 830, based on the estimated occupation status of the radio resources in the selection window, the wireless communication device selects radio resources from the selection window. The selection involves selecting the resources among those which are predicted to be available.

At step 840, using the selected radio resources, the wireless communication device performs at least one D2D transmission to at least one further wireless communication device. The D2D transmission may be an SL transmission. The D2D transmission may be performed in a unicast mode, in a groupcast mode, or in a broadcast mode.

At step 850, the wireless communication device may adapt at least one of the sensing window and the selection window.

The adaptation of step 850 may involve adapting at least one of a size of the sensing window and a size of the selection window, e.g., by adapting one or more of the above-mentioned parameters a, b, T1, T2, $f_{L1}$, $f_{U1}$, $f_{L2}$, $f_{U2}$. Here, adapting the size of the sensing window may involve adapting a length of a time interval covered by the sensing window, i.e., the length of the sensing window, or adapting the size of the selection window may involve adapting a length of a time interval covered by the selection window, i.e., the length of the selection window. Further, adapting the size of the sensing window may involve adapting a width of a of a frequency range covered by the sensing window, i.e., i.e., the width of the sensing window, or adapting the size of the selection window comprises adapting a width of a frequency range covered by the selection window, i.e., the width of the sensing window.

In some scenarios, the adaptation of step 850 may involve adapting at least one of a position of the sensing window and a position of the selection window, e.g., by adapting one or more of the above-mentioned parameters a, b, T1, T2, $f_{L1}$, $f_{U1}$, $f_{L2}$, and $f_{U2}$. Here, adapting the position of the sensing window may involve adapting at least one of a starting time and an end time of the sensing window, e.g., by adapting one or more of the above-mentioned parameters a and b, or adapting the position of the selection window may involve adapting at least one of a starting time and an end time of the selection window, e.g., by adapting at least one of the above-mentioned parameters T1, T2. Further, adapting the position of the sensing window may involve adapting at least one of an upper frequency bound and a lower frequency bound of the sensing window, e.g., by adapting at least one of the above-mentioned parameters $f_{L1}$ and $f_{U1}$, or adapting the position of the selection window may involve adapting at least one of an upper frequency bound and a lower frequency bound of the selection window, e.g., by adapting at least one of the above-mentioned parameters $f_{L2}$ and $f_{U2}$.

In some scenarios, the adaptation of step 850 may involve that the sensing window and the selection window are adapted differently or independently of each other. For example, the sensing window and the selection window could be adapted using different step sizes. Further, only one of the sensing window and the selection window could be adapted, while the other is left un-adapted.

In some scenarios, the adaptation of step 850 may also involve adapting at least one of a step size for adapting the sensing window and a step size for adapting the selection window. The adaptation of step 850 may thus be based on a variable step size.

In some scenarios, the adaptation of step 850 may also involve adapting at least one of a granularity for adapting the sensing window and a granularity for adapting the selection window. Here, the granularity defines a smallest unit of the adaptation, e.g., a smallest possible change in size, a smallest possible change in position, a smallest possible change in width, or a smallest possible change in length. The step size of the adaptation may correspond to the granularity or be larger than the granularity.

In some scenarios, the adaptation of step 850 may also involve that the adaptation is based on previous adaptation of at least one of the sensing window and the selection window. For example, the adaptation may be based on a variable step size, with the step size being incremented or decremented with each adaptation. In some cases, expiry of a timer may reset the step size to an initial value.

The adaptation of step 850 may be based on congestion information indicating a congestion level of radio resources to be used for a D2D transmission by the wireless communication device, e.g., in terms of a CBR. In this case the adaptation of step 660 may involve that, in response to the congestion level being high, e.g., above a threshold, the wireless communication device increases a size of the sensing window and/or a size of the selection window. In addition or as an alternative, the adaptation of step 850 may involve that, in response to the congestion level being low, e.g., below a threshold, the wireless communication device reduces a size of the sensing window and/or a size of the selection window.

In addition or as an alternative, the adaptation of step 850 may be based on a remaining power supply capacity of the wireless communication device, e.g., a remaining battery lifetime. In this case the adaptation of step 660 may involve that, in response to the remaining power supply capacity being high, e.g., above a threshold, the wireless communication device increases a size of the sensing window and/or a size of the selection window. In addition or as an alternative, the adaptation of step 660 may involve that, in response to the remaining power supply capacity being low, e.g., below a threshold, the wireless communication device reducing a size of the sensing window and/or a size of the selection window.

In addition or as an alternative, the adaptation of step 850 may be based on a priority of a further D2D transmission to be performed by the wireless communication device. In this case the adaptation of step 660 may involve that, in response to the priority of the further D2D transmission being high, e.g., above a threshold or some other priority reference, the wireless communication device increases a size of the sensing window and/or a size of the selection window. In addition or as an alternative, the adaptation of step 850 may involve that, in response to the priority of the further D2D transmission being low, e.g., below a threshold or some other priority reference, the wireless communication device reduces a size of the sensing window and/or a size of the selection window.

In addition or as an alternative, the adaptation of step 850 may further be based on priorities of D2D transmissions received by the wireless communication device. The priorities of the received D2D transmissions may be indicated by SCI or other control information associated with each of the received D2D transmissions, e.g., in terms of a priority field or by an indication or flag that the D2D transmission corresponds to high priority traffic, e.g., URLLC traffic. In such scenarios, the adaptation of step 850 may involve that, in response to the priorities of the received D2D transmissions being high, e.g., above a threshold or some other priority reference, the wireless communication device increases a size of the sensing window and/or a size of the selection window. In addition or as an alternative, the adaptation of step 850 may involve that, in response to the priorities of the received D2D transmissions being low, e.g., below a threshold or some other priority reference, the wireless communication device reduce a size of the sensing window and/or a size of the selection window.

In some cases the above-mentioned priority reference may be defined by other D2D transmissions. For example, the adaptation of step 850 may involve that, based on a relation or difference of, on the one hand, a priority of one or more further D2D transmissions performed or to be performed by the wireless communication device to, on the other hand, priorities of D2D transmissions received by the wireless communication device. In such scenarios, the adaptation of step 850 may involve that in response to the priority of the further D2D transmission to be performed being lower than the priorities of D2D transmissions received by the wireless communication device, the wireless communication device reduces a size of the sensing window and/or a size of the selection window. In addition or as an alternative, the adaptation of step 850 may involve that, in response to the priority of the further D2D transmission to be performed being higher than the priorities of D2D transmissions received by the wireless communication device, the wireless communication device increasing a size of the sensing window and/or a size of the selection window.

In each of the above-mentioned cases considering the priorities of the received D2D transmissions, the adaptation of step 850 may be based on averaging of the priorities of the received D2D transmissions, e.g., by using a moving window averaging filter or some other filter to combine the priorities of multiple received D2D transmissions.

In some scenarios, the adaptation of step 850 may be limited to a predefined maximum number of adaptations per time interval. This may for example be achieved by defining an adjustment time interval and a maximum allowed number of adaptations in the adjustment time interval.

In some scenarios, the wireless communication device may then also be configured to perform normal sensing. In other words, in a first mode of operation, the wireless communication device selects radio resources for one or more D2D transmissions by the wireless communication device based on the selection window and the sensing window. In a second mode of operation, the wireless communication device selects radio resources for one or more D2D transmissions by the wireless communication device based on a further selection window and a further sensing window, the further selection window indicating radio resources allowed to be selected by the wireless communication device for a D2D transmission by the wireless communication device and the further sensing window indicating which radio resources are to be used for estimating an occupation status of the radio resources in the selection window. The selection window may then corresponds to a part of the further selection window, i.e., be a partial selection window. Similarly, the sensing window may correspond to a part of the further sensing window, i.e., be a partial sensing window. The further selection window and the further sensing window then correspond to the normal selection window and the normal sensing window, respectively.

At step 860, if the wireless communication device is configured with the first mode of operation and the second mode of operation, the wireless communication device may switch between the first mode of operation and the second mode of operation. For example, the wireless communication device may control switching between the first mode of operation and the second mode of operation based on priorities of D2D transmissions received by the wireless communication device. The priorities of the received D2D transmissions may be indicated by SCI or other control information associated with each of the received D2D transmissions, e.g., in terms of a priority field or by an indication or flag that the D2D transmission corresponds to high priority traffic, e.g., URLLC traffic. For example, the wireless communication device may switch to the second mode of operation in response to the priority of one or more received D2D transmissions being high, e.g. above a threshold.

Further, the wireless communication device may control switching between the first mode of operation and the second mode of operation based on based on priority of one or more D2D transmissions performed or to be performed by the wireless communication device. For example, the wireless communication device may switch to the first mode of operation in response to the priority of a D2D transmission to be transmitted being low, e.g. below a threshold.

Further, the wireless communication device may control switching between the first mode of operation and the second mode of operation based on congestion information indicating a congestion level of radio resources to be used for a D2D transmission by the wireless communication device, e.g., in terms of a CBR. For example, the wireless communication device may switch to the first mode of operation in response to the congestion level being low, e.g. below a threshold.

It is noted that in some variants either step 850 or step 860 could be omitted from the method of FIG. 8.

Figure 9:
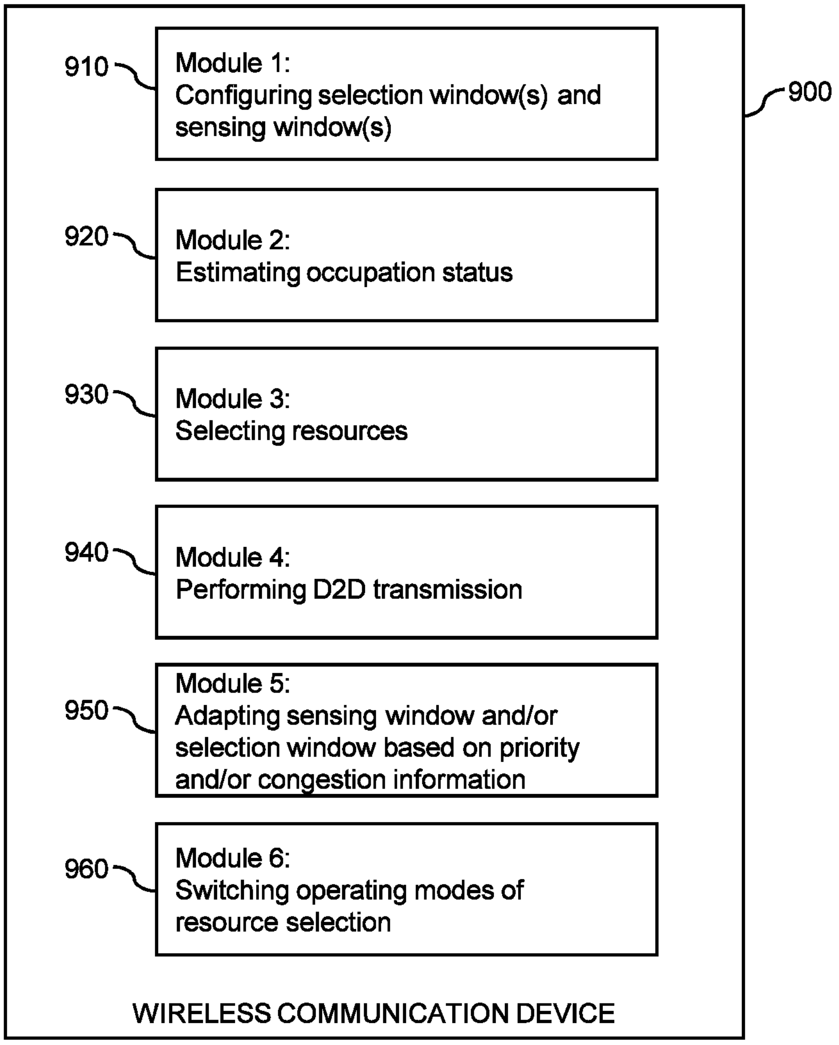
FIG. 9 shows an exemplary block diagram for illustrating functionalities of a wireless communication device implementing functionalities corresponding to the method of FIG. 8.

FIG. 9 shows a block diagram for illustrating functionalities of a wireless communication device 900 which operates according to the method of FIG. 8. The wireless communication device 900 may for example correspond to any of the above-mentioned UEs. As illustrated, the wireless communication device 900 may be provided with a module 910 configured to configure selection window(s) and sensing window(s), such as explained in connection with step 810. Further, the wireless communication device 900 device may be provided with a module 920 configured to estimate an occupation status, such as explained in connection with step 820. Further, the wireless communication device 900 may be provided with a module 930 configured to select resources, such as explained in connection with step 830. Further, the wireless communication device 900 may be provided with a module 940 configured to perform a D2D transmission, such as explained in connection with step 840.

Further, the wireless communication device 900 may be provided with a module 950 configured to adapt at the selection window and/or the sensing window, such as explained in connection with step 850.

Further, the wireless communication device 900 may be provided with a module 960 configured to switch between operating modes of resource selection, such as explained in connection with step 860.

It is noted that the wireless communication device 900 may include further modules for implementing other functionalities, such as known functionalities of a UE in the LTE and/or NR radio technology. Further, it is noted that the modules of the wireless communication device 900 do not necessarily represent a hardware structure of the wireless communication device 700, but may also correspond to functional elements, e.g., implemented by hardware, software, or a combination thereof.

Further, it is noted that in some variants either module 850 or module 860 could be omitted from the network node 1100.

Figure 10:
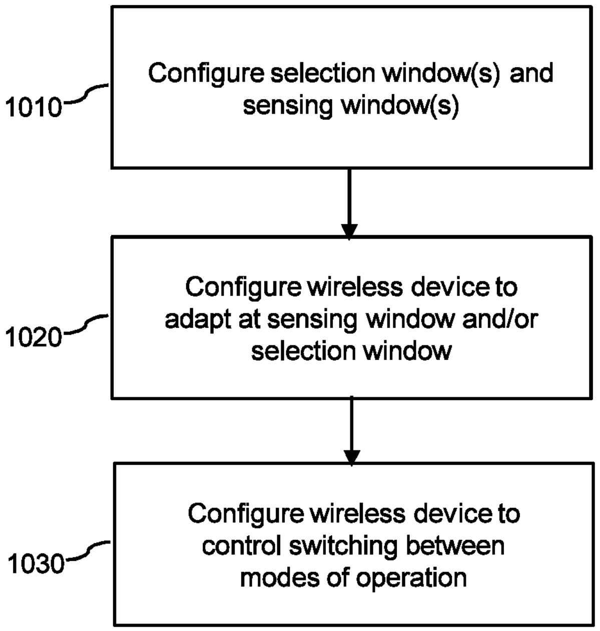
FIG. 10 shows a flowchart for schematically illustrating a further method according to an embodiment.

FIG. 10 shows a flowchart for illustrating a method, which may be utilized for implementing the illustrated concepts. The method of FIG. 10 may be used for implementing the illustrated concepts in a node of a wireless communication network, e.g., corresponding to the above-mentioned access node 100.

If a processor-based implementation of the node is used, at least some of the steps of the method of FIG. 10 may be performed and/or controlled by one or more processors of the node. Such node may also include a memory storing program code for implementing at least some of the below described functionalities or steps of the method of FIG. 10.

At step 1010, the node configures a selection window and a sensing window of a wireless communication device, e.g., corresponding to one of the above-mentioned UEs. The selection window indicates radio resources allowed to be selected by the wireless communication device for a D2D transmission by the wireless communication device and the sensing window indicates which radio resources are to be used for estimating an occupation status of the radio resources in the selection window. The D2D transmission may for example be an SL transmission, e.g., based on the PC5 interface of the LTE technology or on the PC5 interface of the NR technology. In some cases, the selection window and the sensing window may be a partial selection window and a partial sensing window, respectively. In this case, step 1010 may also involve that the node also configures a normal selection window and a normal sensing window, with the partial selection window being sub-part of the normal selection window and the partial sensing window being sub-part of the normal sensing window.

The configuration of step 1010 may involve that the node sends configuration information to the wireless communication device, e.g., using RRC signaling or broadcasted system information. The configuration information may for example indicate a size and/or position of the selection window and a size and/or position of the sensing window.

At step 1020, the node configures the wireless communication device for adapting at least one of the sensing window and the selection window. The adaptation may be based on feedback information related to at least one D2D transmission performed by the wireless communication device on radio resources selected by the wireless communication device based on the estimated occupation status of the radio resources in the selection window.

The configuration of step 1020 may involve that the node sends configuration information to the wireless communication device, e.g., using RRC signaling or broadcasted system information. The configuration information may for example indicate one or more step sizes to be used in the adaptation and/or thresholds to be used in the adaptation.

The adaptation may involve adapting at least one of a size of the sensing window and a size of the selection window, e.g., by adapting one or more of the above-mentioned parameters a, b, T1, T2, $f_{L1}$, $f_{U1}$, $f_{L2}$, $f_{U2}$. Here, adapting the size of the sensing window may involve adapting a length of a time interval covered by the sensing window, i.e., the length of the sensing window, or adapting the size of the selection window may involve adapting a length of a time interval covered by the selection window, i.e., the length of the selection window. Further, adapting the size of the sensing window may involve adapting a width of a of a frequency range covered by the sensing window, i.e., i.e., the width of the sensing window, or adapting the size of the selection window comprises adapting a width of a frequency range covered by the selection window, i.e., the width of the sensing window.

In some scenarios, the adaptation may involve adapting at least one of a position of the sensing window and a position of the selection window, e.g., by adapting one or more of the above-mentioned parameters a, b, T1, T2, $f_{L1}$, $f_{U1}$, $f_{L2}$, and $f_{U2}$. Here, adapting the position of the sensing window may involve adapting at least one of a starting time and an end time of the sensing window, e.g., by adapting one or more of the above-mentioned parameters a and b, or adapting the position of the selection window may involve adapting at least one of a starting time and an end time of the selection window, e.g., by adapting at least one of the above-mentioned parameters T1, T2. Further, adapting the position of the sensing window may involve adapting at least one of an upper frequency bound and a lower frequency bound of the sensing window, e.g., by adapting at least one of the above-mentioned parameters $f_{L1}$ and $f_{U1}$, or adapting the position of the selection window may involve adapting at least one of an upper frequency bound and a lower frequency bound of the selection window, e.g., by adapting at least one of the above-mentioned parameters $f_{L2}$ and $f_{U2}$.

In some scenarios, the adaptation may involve that the sensing window and the selection window are adapted differently or independently of each other. For example, the sensing window and the selection window could be adapted using different step sizes. Further, only one of the sensing window and the selection window could be adapted, while the other is left un-adapted.

In some scenarios, the may also involve adapting at least one of a step size for adapting the sensing window and a step size for adapting the selection window. In each case, the step size may be adapted based on the obtained feedback information. The adaptation may thus be based on a variable step size.

In some scenarios, the adaptation may also involve adapting at least one of a granularity for adapting the sensing window and a granularity for adapting the selection window. Here, the granularity defines a smallest unit of the adaptation, e.g., a smallest possible change in size, a smallest possible change in position, a smallest possible change in width, or a smallest possible change in length. The step size of the adaptation may correspond to the granularity or be larger than the granularity.

In some scenarios, the adaptation may also involve that the adaptation is based on previous adaptation of at least one of the sensing window and the selection window. For example, the adaptation may be based on a variable step size, with the step size being incremented or decremented with each adaptation. In some cases, expiry of a timer may reset the step size to an initial value.

At step 1020, the node may configure at least one of an initial size of the sensing window and an initial size of the selection window. Further, the node may configure at least one of a granularity of the sensing window and a granularity of the selection window. Further, the node may configure at least one of a step size for adapting the sensing window and a step size for adapting the selection window. Further, the node may configure the wireless communication device for, e.g., based on the obtained feedback information, adapting at least one of a step size for adapting the sensing window and a step size for adapting the selection window. Further, the node may configuring the wireless communication device for, based on the obtained feedback information, adapting at least one of a granularity for adapting the sensing window and a granularity for adapting the selection window.

In some cases, the feedback information may include acknowledgement feedback with one or more indications of successful reception of the at least one D2D transmission by the at least one further wireless communication device. The adaptation may then involve that, in response to the one or more positive acknowledgement feedback messages, the wireless communication device reduces a size of the sensing window and/or a size of the selection window. In some cases, the adaptation may involve that, in response to a number of the one or more indications of successful reception exceeding a threshold, the wireless communication device reduces the size of the sensing window and/or the size of the selection window. This number of indications of successful description may be counted per time interval. This time interval and/or the threshold may be configurable. In particular, the node may configure time interval and/or the threshold for the number of the one or more indications of successful reception.

In some cases, the feedback information may include acknowledgement feedback with one or more indications of unsuccessful reception of the at least one D2D transmission by the at least one further wireless communication device. The adaptation then involve that, in response to the one or more indications of unsuccessful reception, the wireless communication device increases a size of the sensing window and/or a size of the selection window. In some cases, the adaptation may involve that, in response to a number of the one or more indications of unsuccessful reception exceeding a threshold, the wireless communication device increases the size of the sensing window and/or the size of the selection window. This number of indications of unsuccessful description may be counted per time interval. This time interval and/or the threshold may be configurable. In particular, the node may configure the time interval and/or the threshold for the number of the one or more indications of unsuccessful reception.

In some scenarios, the adaptation may further be based on congestion information indicating a congestion level of radio resources to be used for a D2D transmission by the wireless communication device, e.g., in terms of a CBR. In this case the adaptation may involve that, in response to the congestion level being high, e.g., above a threshold, the wireless communication device increases a size of the sensing window and/or a size of the selection window. In addition or as an alternative, the adaptation may involve that, in response to the congestion level being low, e.g., below a threshold, the wireless communication device reduces a size of the sensing window and/or a size of the selection window.

In some scenarios, the adaptation may further be based on a remaining power supply capacity of the wireless communication device, e.g., a remaining battery lifetime. In this case the adaptation may involve that, in response to the remaining power supply capacity being high, e.g., above a threshold, the wireless communication device increases a size of the sensing window and/or a size of the selection window. In addition or as an alternative, the adaptation may involve that, in response to the remaining power supply capacity being low, e.g., below a threshold, the wireless communication device reducing a size of the sensing window and/or a size of the selection window.

In some scenarios, the adaptation may further be based on a priority of a further D2D transmission to be performed by the wireless communication device. In this case the adaptation may involve that, in response to the priority of the further D2D transmission being high, e.g., above a threshold or some other priority reference, the wireless communication device increases a size of the sensing window and/or a size of the selection window. In addition or as an alternative, the adaptation may involve that, in response to the priority of the further D2D transmission being low, e.g., below a threshold or some other priority reference, the wireless communication device reduces a size of the sensing window and/or a size of the selection window.

In some scenarios, the adaptation may further be based on priorities of D2D transmissions received by the wireless communication device. The priorities of the received D2D transmissions may be indicated by SCI or other control information associated with each of the received D2D transmissions, e.g., in terms of a priority field or by an indication or flag that the D2D transmission corresponds to high priority traffic, e.g., URLLC traffic. In such scenarios, the adaptation may involve that, in response to the priorities of the received D2D transmissions being high, e.g., above a threshold or some other priority reference, the wireless communication device increases a size of the sensing window and/or a size of the selection window. In addition or as an alternative, the adaptation may involve that, in response to the priorities of the received D2D transmissions being low, e.g., below a threshold or some other priority reference, the wireless communication device reduce a size of the sensing window and/or a size of the selection window.

In some cases the above-mentioned priority reference may be defined by other D2D transmissions. For example, the adaptation may involve that, based on a relation or difference of, on the one hand, a priority of one or more further D2D transmissions performed or to be performed by the wireless communication device to, on the other hand, priorities of D2D transmissions received by the wireless communication device. In such scenarios, the adaptation may involve that in response to the priority of the further D2D transmission to be performed being lower than the priorities of D2D transmissions received by the wireless communication device, the wireless communication device reduces a size of the sensing window and/or a size of the selection window. In addition or as an alternative, the adaptation of may involve that, in response to the priority of the further D2D transmission to be performed being higher than the priorities of D2D transmissions received by the wireless communication device, the wireless communication device increasing a size of the sensing window and/or a size of the selection window.

In each of the above-mentioned cases considering the priorities of the received D2D transmissions, the adaptation may be based on averaging of the priorities of the received D2D transmissions, e.g., by using a moving window averaging filter or some other filter to combine the priorities of multiple received D2D transmissions.

In some scenarios, the adaptation may be limited to a predefined maximum number of adaptations per time interval. This may for example be achieved by defining an adjustment time interval and a maximum allowed number of adaptations in the adjustment time interval.

As mentioned above the node may configure the wireless communication device with a partial sensing window for partial sensing and with a normal sensing window for normal sensing. In particular, at step 1030 the node may configure the wireless communication device with a first mode of operation, in which the wireless communication device selects radio resources for one or more D2D transmissions by the wireless communication device based on the selection window and the sensing window, and a second mode of operation, in which the wireless communication device selects radio resources for one or more D2D transmissions by the wireless communication device based on a further selection window and a further sensing window. The further selection window indicates radio resources allowed to be selected by the wireless communication device for a D2D transmission by the wireless communication device and the further sensing window indicates which radio resources are to be used for estimating an occupation status of the radio resources in the selection window. The selection window may then corresponds to a part of the further selection window, i.e., be a partial selection window. Similarly, the sensing window may correspond to a part of the further sensing window, i.e., be a partial sensing window. The further selection window and the further sensing window then correspond to the normal selection window and the normal sensing window, respectively.

Further, the node may configure the wireless communication device to switch between the first mode of operation and the second mode of operation. For example, the node may configure the wireless communication device to control switching between the first mode of operation and the second mode of operation based on priorities of D2D transmissions received by the wireless communication device. The priorities of the received D2D transmissions may be indicated by SCI or other control information associated with each of the received D2D transmissions, e.g., in terms of a priority field or by an indication or flag that the D2D transmission corresponds to high priority traffic, e.g., URLLC traffic. For example, the node may configure the wireless communication device to switch to the second mode of operation in response to the priority of one or more received a D2D transmission being high, e.g. above a threshold. The threshold may be configured by the node.

Further, the node may configure the wireless communication device to control switching between the first mode of operation and the second mode of operation based on based on priority of one or more D2D transmissions performed or to be performed by the wireless communication device. For example, the node may configure the wireless communication device to switch to the first mode of operation in response to the priority of a D2D transmission to be transmitted being low, e.g. below a threshold. The threshold may be configured by the node.

Further, the node may configure the wireless communication device to control switching between the first mode of operation and the second mode of operation based on congestion information indicating a congestion level of radio resources to be used for a D2D transmission by the wireless communication device, e.g., in terms of a CBR. For example, the node may configure the wireless communication device to switching to the first mode of operation in response to the congestion level being low, e.g. below a threshold. The threshold may be configured by the node.

The configuration of step 1030 may involve that the node sends configuration information to the wireless communication device, e.g., using RRC signaling or broadcasted system information. The configuration information may for example indicate one or more thresholds to be used in for controlling switching between the first mode of operation and/or the second mode of operation.

It is noted that in some variants either step 1020 or step 1030 could be omitted from the method of FIG. 10.

Figure 11:
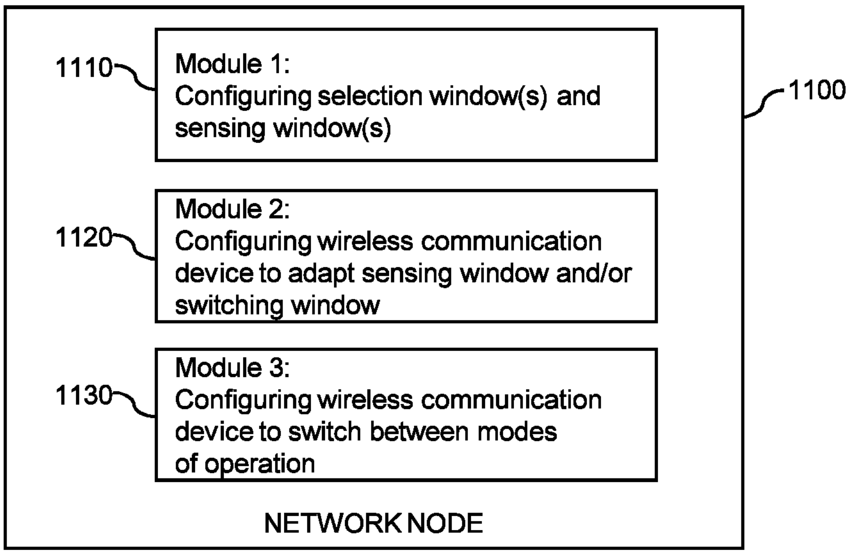
FIG. 11 shows an exemplary block diagram for illustrating functionalities of a network node implementing functionalities corresponding to the method of FIG. 10.

FIG. 11 shows a block diagram for illustrating functionalities of node 1100 for a wireless communication network which operates according to the method of FIG. 10. The node 1100 may for example correspond to any of the above-mentioned access nodes. As illustrated, the node 1100 may be provided with a module 1110 configured to configure selection window(s) and sensing window(s) of a wireless communication device, such as explained in connection with step 1010. Further, the node 1100 may be provided with a module 1120 configured to configure the wireless communication device for adaptation of the selection window and/or sensing window, such as explained in connection with step 1020. Further, the node 1000 may be provided with a module 1130 configured to configure the wireless communication device with a first mode of operation and a second mode of operation for allocation of resources for D2D transmission, such as explained in connection with step 1030.

It is noted that the node 1100 may include further modules for implementing other functionalities, such as known functionalities of a eNB in the LTE technology and/or a gNB in the NR technology. Further, it is noted that the modules of the node 1100 do not necessarily represent a hardware structure of the node 1100, but may also correspond to functional elements, e.g., implemented by hardware, software, or a combination thereof.

Further, it is noted that in some variants either module 1120 or module 1130 could be omitted from the network node 1100.

It is to be understood that the functionalities as described in connection with FIGS. 6 to 11 may also be combined in various ways, e.g., in a system which includes two or more wireless communication devices operating according to the method of FIG. 6 or 8 or in a system which includes one or more wireless communication devices operating according to the method of FIG. 6 or 8 and a node operating according to the method of FIG. 10.

Figure 12:
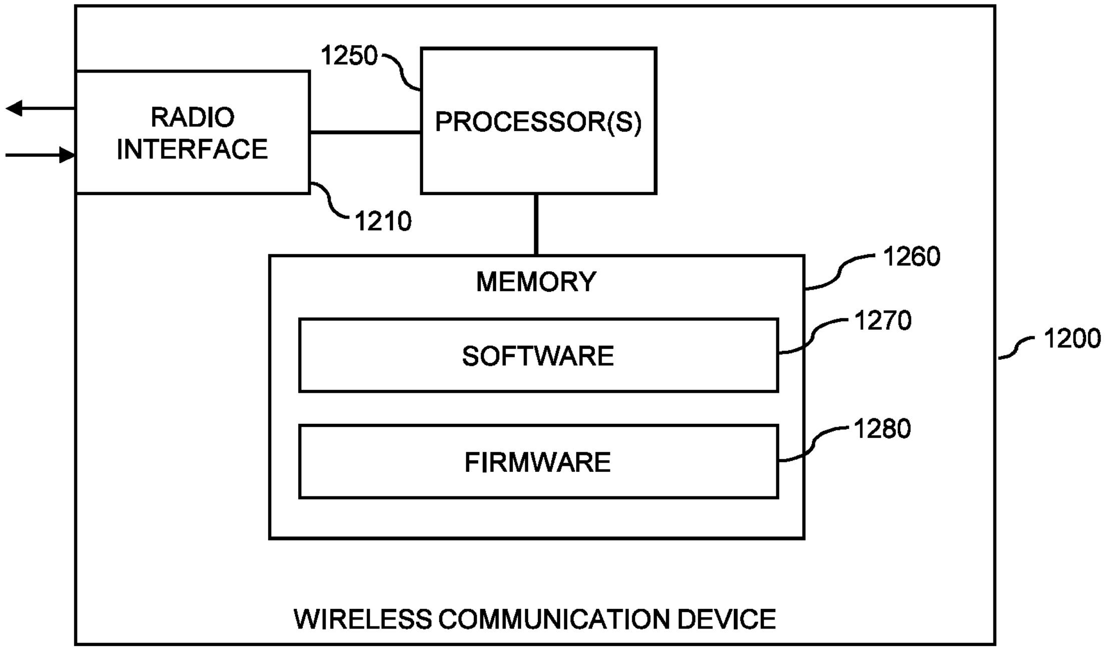
FIG. 12 schematically illustrates structures of a wireless communication device according to an embodiment of the invention.

FIG. 12 illustrates a processor-based implementation of a wireless communication device 1200 which may be used for implementing the above-described concepts. For example, the structures as illustrated in FIG. 12 may be used for implementing the concepts in any of the above-mentioned UEs.

As illustrated, the wireless communication device 1200 includes one or more radio interfaces 1210. The radio interface(s) 1210 may for example be based on the NR technology or the LTE technology. The radio interface(s) 1210 may support D2D communication, e.g., using SL communication as specified for the NR technology or the LTE technology.

Further, the wireless communication device 1200 may include one or more processors 1250 coupled to the radio interface(s) 1210 and a memory 1260 coupled to the processor(s) 1250. By way of example, the radio interface(s) 1210, the processor(s) 1250, and the memory 1260 could be coupled by one or more internal bus systems of the wireless communication device 1200. The memory 1260 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 1160 may include software 1270 and/or firmware 1280. The memory 1260 may include suitably configured program code to be executed by the processor(s) 1250 so as to implement the above-described functionalities for controlling D2D communication, such as explained in connection with FIGS. 6 to 9.

It is to be understood that the structures as illustrated in FIG. 12 are merely schematic and that the wireless communication device 1200 may actually include further components which, for the sake of clarity, have not been illustrated, e.g., further interfaces, such as a dedicated management interface, or further processors. Also, it is to be understood that the memory 1260 may include further program code for implementing known functionalities of a UE. According to some embodiments, also a computer program may be provided for implementing functionalities of the wireless communication device 1200, e.g., in the form of a physical medium storing the program code and/or other data to be stored in the memory 1260 or by making the program code available for download or by streaming.

Figure 13:
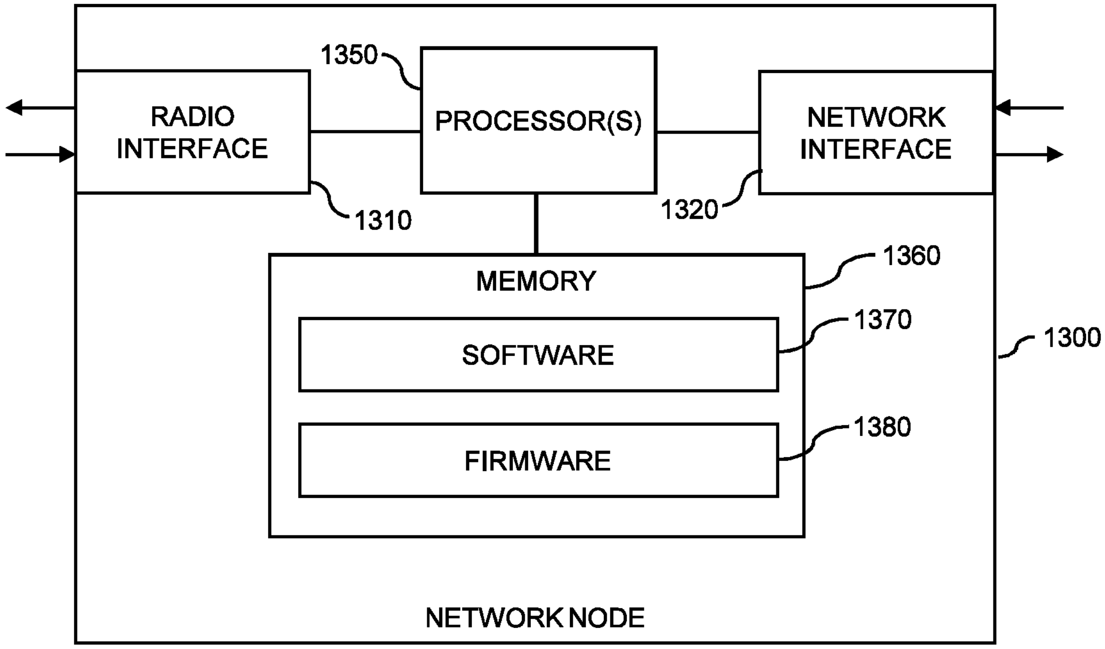
FIG. 13 schematically illustrates structures of a network node according to an embodiment of the invention.

FIG. 13 illustrates a processor-based implementation of a node 1300 for a wireless communication network, which may be used for implementing the above-described concepts. For example, the structures as illustrated in FIG. 13 may be used for implementing the concepts in any of the above-mentioned access nodes.

As illustrated, the node 1300 may include one or more radio interfaces 1310. The radio interface(s) 1310 may for example be based on the NR technology or the LTE technology. The radio interface(s) 1310 may be used for controlling wireless communication devices, such as any of the above-mentioned UEs. In addition, the node 1300 may include one or more network interfaces 1320. The network interface(s) 1320 may for example be used for communication with one or more other nodes of the wireless communication network. Also the network interface(s) 1320 may be used for controlling wireless communication devices, such as any of the above-mentioned UEs.

Further, the node 1300 may include one or more processors 1350 coupled to the interface(s) 1310, 1320 and a memory 1360 coupled to the processor(s) 1350. By way of example, the interface(s) 1310, the processor(s) 1350, and the memory 1360 could be coupled by one or more internal bus systems of the node 1300. The memory 1360 may include a ROM, e.g., a flash ROM, a RAM, e.g., a DRAM or SRAM, a mass storage, e.g., a hard disk or solid state disk, or the like. As illustrated, the memory 1360 may include software 1370 and/or firmware 1280. The memory 1360 may include suitably configured program code to be executed by the processor(s) 1350 so as to implement the above-described functionalities for controlling D2D communication, such as explained in connection with FIGS. 10 and 11.

It is to be understood that the structures as illustrated in FIG. 13 are merely schematic and that the wireless communication device 1300 may actually include further components which, for the sake of clarity, have not been illustrated, e.g., further interfaces, such as a dedicated management interface, or further processors. Also, it is to be understood that the memory 1360 may include further program code for implementing known functionalities of an eNB or of a gNB. According to some embodiments, also a computer program may be provided for implementing functionalities of the node 1300, e.g., in the form of a physical medium storing the program code and/or other data to be stored in the memory 1360 or by making the program code available for download or by streaming.

As can be seen, the concepts as described above may be used for enabling efficient resource selection for D2D communication. In particular, the concepts may allow for reducing power consumption of UEs due to the sensing of resources. Further, the concepts allow for appropriately adjusting the selection window and/or sensing window, considering various conditions that may affect D2D transmissions. In this way, the power consumption due to the sensing of resources may be reduced without excessively increasing the risk of colliding D2D transmissions.

It is to be understood that the examples and embodiments as explained above are merely illustrative and susceptible to various modifications. For example, the illustrated concepts may be applied in connection with various kinds of radio technologies and D2D communication, without limitation the SL mode of the LTE technology or NR technology, e.g., in connection with WLAN technologies or other wireless ad-hoc network technologies.

Further, the concepts may be applied with respect to various types of UEs, without limitation to vehicle-based UEs. Further, the concepts may be applied in connection with various services supported by D2D communication, without limitation to V2X, NSPS, or NCIS. Further, the aspects of the illustrated concepts which relate to adapting the selection window and/or the sensing window based on congestion information and/or based on priorities could also be used without the adaptation based on the feedback information. Further, the aspects of the illustrated concepts which relate to configuring both a partial sensing mode and a normal sensing mode and selecting between these modes could also be used without the adaptation based on the feedback information. Moreover, it is to be understood that the above concepts may be implemented by using correspondingly designed software to be executed by one or more processors of an existing device or apparatus, or by using dedicated device hardware. Further, it should be noted that the illustrated apparatuses or devices may each be implemented as a single device or as a system of multiple interacting devices or modules.

The invention claimed is:

1. A method of controlling device-to-device (D2D) communication in a wireless communication network, the method performed by a wireless communication device and comprising:

- configuring a selection window and a sensing window, the selection window indicating radio resources allowed to be selected by the wireless communication device for a D2D transmission by the wireless communication device and the sensing window indicating which radio resources are to be monitored by the wireless communication device for estimating an occupation status of the radio resources in the selection window;
- selecting, based on an estimated occupation status of the radio resources in the selection window, radio resources from the selection window;
- performing at least one D2D transmission to at least one further wireless communication device, using the selected radio resources;
- obtaining feedback information related to the at least one performed D2D transmission; and
- adapting one or both of the sensing window and the selection window, based on the feedback.

2. The method according to claim 1, wherein the adapting comprises adapting one or both of the sensing window and the selection window, with the adapting resulting in an adaptation of one or both of a window size and a window position.

3. The method according to claim 1, wherein the adapting comprises making different adaptations to the sensing window as compared to the selection window.

4. The method according to claim 1, further comprising changing a step size for adapting the sensing window or the selection window, based on the feedback.

5. The method according to claim 1, further comprising changing an adaptation granularity for making adaptations to one or both of the sensing window and the selection window.

6. The method according to claim 1, wherein the feedback comprises acknowledgement feedback for the at least one D2D transmission.

7. The method according to claim 6, wherein the adapting comprises reducing a size of one or both of the sensing window and the selection window, responsive to the acknowledgement feedback being positive.

8. The method according to claim 6, wherein the adapting comprises increasing a size of one or both of the sensing window and the selection window, responsive to the acknowledgement feedback being negative.

9. The method according to claim 1, wherein the adapting is further based on congestion information indicating a congestion level of radio resources to be used for a D2D transmission by the wireless communication device.

10. The method according to claim 1, wherein the adapting is further based on a battery level of the wireless communication device.

11. The method according to claim 1, wherein the adapting is further based on a priority of a further D2D transmission to be performed by the wireless communication device.

12. The method according to claim 1, wherein the adapting is further based on priorities of D2D transmissions received by the wireless communication device.

13. The method according to claim 1, wherein the method includes the wireless communication device selecting radio resources for one or more D2D transmissions according to the selection window and the sensing window, while operating in a first mode, and selecting radio resources for one or more D2D transmissions according to a further selection window and a further sensing window, while operating in a second mode, wherein the selection window used in the first mode corresponds to a part of the further selection window used in the second mode.

14. The method according to claim 1, wherein configuring the selection window and the sensing window comprises the wireless communication device receiving signaling from a node of the wireless communication network that conveys configuration information, and configuring the selection window and the sensing window according to the configuration information.

15. A method of controlling device-to-device (D2D) communication in a wireless communication network, the method performed by a node of the wireless communication network and comprising:

- configuring a selection window and a sensing window to be used by a wireless communication device, the selection window indicating radio resources allowed to be selected by the wireless communication device for a D2D transmission by the wireless communication device and the sensing window indicating which radio resources are to be used by the wireless communication device for estimating an occupation status of the radio resources in the selection window; and configuring the wireless communication device for adapting at least one of the sensing window and the selection window, based on feedback information related to at least one D2D transmission performed by the wireless communication device on radio resources selected by the wireless communication device based on an estimated occupation status of the radio resources in the selection window.

16. The method according to claim 15, wherein the adapting comprises adapting one or both of the size of the sensing window and the size of the selection window.

17. The method according to claim 16, wherein adapting the size of either the sensing window or the selection window comprises at least one of adapting the size in the frequency domain or adapting the size in the time domain.

18. The method according to claim 15, wherein configuring the selection window and the sensing window to be used by the wireless communication device and configuring the wireless communication device for adapting at least one of the selection window and the sensing window comprises transmitting configuration information.

19. A wireless communication device, the wireless communication device comprising:

a radio interface configured for device-to-device (D2D) transmission and reception; and processing circuitry operatively associated with the radio interface and configured to:

configure a selection window and a sensing window, the selection window indicating radio resources allowed to be selected by the wireless communication device for a D2D transmission by the wireless communication device and the sensing window indicating which radio resources are to be used by the wireless communication device for estimating an occupation status of the radio resources in the selection window, based on monitoring the radio resources indicated by the sensing window;

select radio resources from the selection window, based on an estimated occupation status of the radio resources in the selection window;

perform at least one D2D transmission to at least one further wireless communication device, using the selected radio resources;

obtain feedback related to the at least one performed D2D transmission; and adapt one or both of the sensing window and the selection window, based on the feedback.

20. A node configured for operation in a wireless communication network, the node comprising:

a communication interface configured for communicating directly or indirectly with wireless devices; and processing circuitry operatively associated with the communication interface and configured to:

configure a selection window and a sensing window to be used by a wireless communication device, the selection window indicating radio resources allowed to be selected by the wireless communication device for a device-to-device (D2D) transmission by the wireless communication device and the sensing window indicating which radio resources are to be used by the wireless communication device for estimating an occupation status of the radio resources in the selection window; and configure the wireless communication device for adapting at least one of the sensing window and the selection window, based on feedback received by the wireless communication device that is related to at least one D2D transmission performed by the wireless communication device on radio resources selected by the wireless communication device based on an estimated occupation status of the radio resources in the selection window.

* * * * *